(12) United States Patent
Beaulieu et al.

(10) Patent No.: US 8,974,281 B2
(45) Date of Patent: Mar. 10, 2015

(54) ELIMINATION GAMES FOR GAMING MACHINES

(75) Inventors: Nicole M. Beaulieu, Reno, NV (US); Steven G. LeMay, Reno, NV (US)

(73) Assignee: IGT, Las Vegas, NV (US)

( * ) Notice: Subject to any disclaimer, the term of this patent is extended or adjusted under 35 U.S.C. 154(b) by 300 days.

(21) Appl. No.: 13/420,075

(22) Filed: Mar. 14, 2012

(65) Prior Publication Data

US 2012/0172123 A1 Jul. 5, 2012

Related U.S. Application Data

(60) Division of application No. 12/341,736, filed on Dec. 22, 2008, now Pat. No. 8,162,743, which is a continuation of application No. 10/176,171, filed on Jun. 19, 2002, now Pat. No. 7,485,043.

(51) Int. Cl.
*A63F 9/24* (2006.01)

(52) U.S. Cl.
USPC ............ 463/16; 463/20; 463/25; 463/29

(58) Field of Classification Search
USPC .............................. 463/16, 20, 25
IPC ............................. G07F 17/32
See application file for complete search history.

(56) References Cited

U.S. PATENT DOCUMENTS

| | | | |
|---|---|---|---|
| 1,978,395 | A | 10/1934 | Groetchen |
| 2,545,644 | A | 3/1951 | Benton et al. |
| 2,743,108 | A | 4/1956 | Sanders |
| 2,942,574 | A | 6/1960 | Golay |
| 3,420,525 | A | 1/1969 | Waders |
| 3,618,019 | A | 11/1971 | Nemirovsky |
| 3,642,287 | A | 2/1972 | Lally et al. |
| 3,735,987 | A | 5/1973 | Ohki |
| 3,904,207 | A | 9/1975 | Gold |

(Continued)

FOREIGN PATENT DOCUMENTS

| | | |
|---|---|---|
| AU | 524709 | 9/1982 |
| AU | 555905 | 10/1986 |

(Continued)

OTHER PUBLICATIONS

Robert Ciaffone, "Tournament General Rules", Feb. 25, 2002.

(Continued)

*Primary Examiner* — Omkar Deodhar
(74) *Attorney, Agent, or Firm* — Neal, Gerber & Eisenberg LLP

(57) ABSTRACT

The present disclosure provides a gaming machine including an elimination game. The elimination game may be played on a stand-alone gaming machine or on a group of linked gaming machines. The elimination game is played by plurality of entities, each comprising one or more virtual players or real players. During the elimination game, the entities play one or more games that are provided as part of the elimination game. For example, video slot or poker games may be used for the game play in the elimination game. One or more elimination tests are applied to the entities using results from the game play. When conditions used in the elimination tests are met for one of the entities, that entity is removed from the elimination game before reaching the finish of the elimination game. The last remaining entity that avoids elimination and reaches the finish of the elimination receives an award.

14 Claims, 13 Drawing Sheets

(56) References Cited

U.S. PATENT DOCUMENTS

| | | |
|---|---|---|
| 3,971,557 A | 7/1976 | Breslow et al. |
| 3,975,022 A | 8/1976 | Figueroa |
| 3,998,309 A | 12/1976 | Mandas et al. |
| 4,072,930 A | 2/1978 | Lucero et al. |
| 4,182,515 A | 1/1980 | Nemeth |
| 4,198,052 A | 4/1980 | Gauselmann |
| 4,238,127 A | 12/1980 | Lucero et al. |
| 4,277,064 A | 7/1981 | Newman |
| 4,283,709 A | 8/1981 | Lucero et al. |
| 4,335,809 A | 6/1982 | Wain |
| 4,339,798 A | 7/1982 | Hedges et al. |
| 4,363,485 A | 12/1982 | Edwall |
| 4,409,656 A | 10/1983 | Andersen et al. |
| 4,410,178 A | 10/1983 | Partridge |
| 4,448,419 A | 5/1984 | Telnaes |
| 4,494,197 A | 1/1985 | Troy et al. |
| 4,560,161 A | 12/1985 | Hamano |
| 4,573,681 A | 3/1986 | Okada |
| 4,582,324 A | 4/1986 | Koza et al. |
| 4,618,150 A | 10/1986 | Kimura |
| 4,621,814 A | 11/1986 | Stepan et al. |
| 4,624,459 A | 11/1986 | Kaufman |
| 4,636,951 A | 1/1987 | Harlick |
| 4,652,998 A | 3/1987 | Koza et al. |
| 4,669,731 A | 6/1987 | Clarke |
| 4,679,143 A | 7/1987 | Hagiwara |
| 4,695,053 A | 9/1987 | Vazquez, Jr. et al. |
| 4,721,307 A | 1/1988 | Okada |
| 4,732,386 A | 3/1988 | Rayfiel |
| 4,743,024 A | 5/1988 | Helm et al. |
| 4,756,531 A | 7/1988 | DiRe et al. |
| 4,760,527 A | 7/1988 | Sidley |
| 4,775,155 A | 10/1988 | Lees |
| 4,805,907 A | 2/1989 | Hagiwara |
| 4,817,951 A | 4/1989 | Crouch et al. |
| 4,836,546 A | 6/1989 | DiRe et al. |
| 4,837,728 A | 6/1989 | Barrie et al. |
| 4,838,552 A | 6/1989 | Hagiwara |
| 4,842,278 A | 6/1989 | Markowicz |
| 4,844,464 A | 7/1989 | Berge |
| 4,856,787 A | 8/1989 | Itkis |
| 4,871,171 A | 10/1989 | Rivero |
| 4,880,237 A | 11/1989 | Kishishita |
| 4,926,327 A | 5/1990 | Sidley |
| 4,964,638 A | 10/1990 | Ishida |
| 4,991,848 A | 2/1991 | Greenwood et al. |
| 5,019,973 A | 5/1991 | Wilcox et al. |
| 5,033,744 A | 7/1991 | Bridgeman et al. |
| 5,038,022 A | 8/1991 | Lucero |
| 5,046,737 A | 9/1991 | Fienberg |
| 5,048,833 A | 9/1991 | Lamle |
| 5,058,893 A | 10/1991 | Bertram et al. |
| 5,074,559 A | 12/1991 | Okada |
| 5,083,271 A | 1/1992 | Thacher et al. |
| 5,092,598 A | 3/1992 | Kamille |
| 5,116,055 A | 5/1992 | Tracy |
| 5,123,649 A | 6/1992 | Tiberio |
| 5,127,651 A | 7/1992 | Okada |
| 5,152,529 A | 10/1992 | Okada |
| 5,158,293 A | 10/1992 | Mullins |
| 5,178,390 A | 1/1993 | Okada |
| 5,186,460 A | 2/1993 | Fongeallaz et al. |
| 5,205,555 A | 4/1993 | Hamano |
| 5,209,479 A | 5/1993 | Nagao |
| 5,217,224 A | 6/1993 | Sincock |
| 5,242,163 A | 9/1993 | Fulton |
| 5,249,800 A | 10/1993 | Hilgendorf et al. |
| 5,259,616 A | 11/1993 | Bergmann |
| 5,265,874 A | 11/1993 | Dickinson et al. |
| 5,275,400 A | 1/1994 | Weingardt |
| 5,276,312 A | 1/1994 | McCarthy |
| 5,277,424 A | 1/1994 | Wilms |
| 5,280,909 A | 1/1994 | Tracy |
| 5,286,023 A | 2/1994 | Wood |
| 5,288,081 A | 2/1994 | Breeding |
| 5,290,033 A | 3/1994 | Bittner et al. |
| 5,292,127 A | 3/1994 | Kelly et al. |
| 5,308,065 A | 5/1994 | Bridgeman et al. |
| 5,321,241 A | 6/1994 | Craine |
| 5,324,035 A | 6/1994 | Morris et al. |
| 5,326,104 A | 7/1994 | Pease et al. |
| 5,332,228 A | 7/1994 | Schultz |
| 5,342,047 A | 8/1994 | Heidel et al. |
| 5,342,049 A | 8/1994 | Wichinsky et al. |
| 5,344,144 A | 9/1994 | Canon |
| 5,351,970 A | 10/1994 | Fioretti |
| 5,364,100 A | 11/1994 | Ludlow et al. |
| 5,377,993 A | 1/1995 | Josephs |
| 5,380,007 A | 1/1995 | Travis et al. |
| 5,393,057 A | 2/1995 | Marnell, II |
| 5,393,061 A | 2/1995 | Manship et al. |
| 5,395,111 A | 3/1995 | Inoue |
| 5,397,125 A | 3/1995 | Adams |
| 5,398,932 A | 3/1995 | Eberhardt et al. |
| 5,401,024 A | 3/1995 | Simunek |
| 5,407,200 A | 4/1995 | Zalabah |
| 5,411,271 A | 5/1995 | Mirando |
| 5,417,430 A | 5/1995 | Breeding |
| 5,423,539 A | 6/1995 | Nagao |
| 5,429,361 A | 7/1995 | Raven et al. |
| 5,431,408 A | 7/1995 | Adams |
| 5,449,173 A | 9/1995 | Thomas et al. |
| 5,456,465 A | 10/1995 | Durham |
| 5,470,079 A | 11/1995 | LeStrange et al. |
| 5,472,194 A | 12/1995 | Breeding et al. |
| 5,472,197 A | 12/1995 | Gwiasda et al. |
| 5,476,259 A | 12/1995 | Weingardt |
| 5,489,101 A | 2/1996 | Moody |
| 5,511,781 A | 4/1996 | Wood |
| 5,524,888 A | 6/1996 | Heidel |
| 5,531,441 A | 7/1996 | Dabrowski et al. |
| 5,536,016 A | 7/1996 | Thompson |
| 5,542,669 A | 8/1996 | Charron et al. |
| 5,544,892 A | 8/1996 | Breeding |
| 5,544,893 A | 8/1996 | Jones et al. |
| 5,547,192 A | 8/1996 | Ishibashi |
| 5,560,603 A | 10/1996 | Seelig et al. |
| 5,564,700 A | 10/1996 | Celona |
| 5,564,701 A | 10/1996 | Dettor |
| 5,566,337 A | 10/1996 | Szymanski |
| 5,570,885 A | 11/1996 | Ornstein |
| 5,580,053 A | 12/1996 | Crouch |
| 5,580,309 A | 12/1996 | Piechowiak et al. |
| 5,584,485 A | 12/1996 | Jone et al. |
| 5,584,763 A | 12/1996 | Kelly et al. |
| 5,584,764 A | 12/1996 | Inoue |
| 5,601,487 A | 2/1997 | Oshima |
| 5,605,506 A | 2/1997 | Hoorn et al. |
| 5,609,524 A | 3/1997 | Inoue |
| 5,611,535 A | 3/1997 | Tiberio |
| 5,611,730 A | 3/1997 | Weiss |
| 5,622,366 A | 4/1997 | Inoue |
| 5,626,341 A | 5/1997 | Jones |
| 5,639,089 A | 6/1997 | Matsumoto et al. |
| 5,641,050 A | 6/1997 | Smith et al. |
| 5,641,730 A | 6/1997 | Brown |
| 5,645,486 A | 7/1997 | Nagao et al. |
| 5,647,798 A | 7/1997 | Falciglia |
| 5,655,961 A | 8/1997 | Acres et al. |
| 5,664,998 A | 9/1997 | Seelig et al. |
| 5,674,128 A | 10/1997 | Holch et al. |
| 5,702,304 A | 12/1997 | Acres et al. |
| 5,707,285 A | 1/1998 | Place et al. |
| 5,707,286 A | 1/1998 | Carlson |
| 5,711,525 A | 1/1998 | Breeding |
| 5,720,483 A | 2/1998 | Trinh |
| 5,722,891 A | 3/1998 | Inoue |
| 5,732,948 A | 3/1998 | Yoseloff |
| 5,741,183 A | 4/1998 | Acres et al. |
| 5,743,523 A | 4/1998 | Kelly et al. |
| 5,743,524 A | 4/1998 | Nannicola |
| 5,743,526 A | 4/1998 | Inoue |
| 5,743,800 A | 4/1998 | Huard et al. |
| 5,752,881 A | 5/1998 | Inoue |

(56) References Cited

U.S. PATENT DOCUMENTS

| | | |
|---|---|---|
| 5,752,882 A | 5/1998 | Acres et al. |
| 5,755,619 A | 5/1998 | Matsumoto et al. |
| 5,755,621 A | 5/1998 | Marks et al. |
| 5,758,875 A | 6/1998 | Giacalone, Jr. |
| 5,761,647 A | 6/1998 | Boushy |
| 5,762,552 A | 6/1998 | Vuong et al. |
| 5,766,076 A | 6/1998 | Pease et al. |
| 5,769,716 A | 6/1998 | Saffari et al. |
| 5,772,506 A | 6/1998 | Marks et al. |
| 5,772,509 A | 6/1998 | Weiss |
| 5,772,511 A | 6/1998 | Smeltzer |
| RE35,864 E | 7/1998 | Weingardt |
| 5,775,692 A | 7/1998 | Watts et al. |
| 5,779,242 A | 7/1998 | Kaufmann |
| 5,779,544 A | 7/1998 | Seelig et al. |
| 5,779,545 A | 7/1998 | Berg et al. |
| 5,779,547 A | 7/1998 | SoRelle et al. |
| 5,779,549 A | 7/1998 | Walker et al. |
| 5,788,573 A | 8/1998 | Baerlocher et al. |
| 5,800,269 A | 9/1998 | Holch et al. |
| 5,806,045 A | 9/1998 | Biorge et al. |
| 5,806,855 A | 9/1998 | Cherry |
| 5,807,172 A | 9/1998 | Piechowiak |
| 5,816,918 A | 10/1998 | Kelly et al. |
| 5,820,459 A | 10/1998 | Acres et al. |
| 5,820,460 A | 10/1998 | Fulton |
| 5,823,872 A | 10/1998 | Prather et al. |
| 5,823,873 A | 10/1998 | Moody |
| 5,823,874 A | 10/1998 | Adams |
| 5,823,879 A | 10/1998 | Goldberg et al. |
| D400,597 S | 11/1998 | Hedrick et al. |
| 5,833,536 A | 11/1998 | Davids et al. |
| 5,833,537 A | 11/1998 | Barrie |
| 5,833,538 A | 11/1998 | Weiss |
| 5,833,540 A | 11/1998 | Miodunski et al. |
| 5,836,817 A | 11/1998 | Acres et al. |
| D402,702 S | 12/1998 | Seelig et al. |
| 5,846,132 A | 12/1998 | Junkin |
| 5,848,932 A | 12/1998 | Adams |
| 5,851,011 A | 12/1998 | Lott |
| 5,851,148 A | 12/1998 | Brune et al. |
| 5,851,149 A | 12/1998 | Xidos et al. |
| D404,436 S | 1/1999 | McGahn et al. |
| 5,855,514 A | 1/1999 | Kamille |
| 5,855,515 A | 1/1999 | Pease et al. |
| 5,863,249 A | 1/1999 | Inoue |
| 5,873,781 A | 2/1999 | Keane |
| D406,865 S | 3/1999 | Heidel |
| 5,876,284 A | 3/1999 | Acres et al. |
| 5,882,261 A | 3/1999 | Adams |
| 5,885,157 A | 3/1999 | Harada et al. |
| 5,885,158 A | 3/1999 | Torango et al. |
| 5,890,962 A | 4/1999 | Takemoto |
| 5,893,718 A | 4/1999 | O'Donnell |
| 5,902,184 A | 5/1999 | Bennett |
| 5,902,983 A | 5/1999 | Crevelt et al. |
| 5,910,048 A | 6/1999 | Feinberg |
| 5,911,418 A | 6/1999 | Adams et al. |
| 5,917,725 A | 6/1999 | Thacher et al. |
| 5,919,088 A | 7/1999 | Weiss |
| 5,924,927 A | 7/1999 | Matsuura et al. |
| 5,927,714 A | 7/1999 | Kaplan |
| 5,934,672 A | 8/1999 | Sines et al. |
| 5,935,000 A | 8/1999 | Sanchez, III et al. |
| 5,935,002 A | 8/1999 | Falciglia |
| 5,941,772 A | 8/1999 | Paige |
| 5,941,773 A | 8/1999 | Harlick |
| 5,944,606 A | 8/1999 | Gerow |
| 5,947,820 A | 9/1999 | Morro et al. |
| 5,947,822 A | 9/1999 | Weiss |
| 5,951,011 A | 9/1999 | Potter et al. |
| 5,951,397 A | 9/1999 | Dickinson |
| 5,964,463 A | 10/1999 | Moore, Jr. |
| 5,967,894 A | 10/1999 | Kinoshita et al. |
| 5,976,015 A | 11/1999 | Seelig et al. |
| 5,976,016 A | 11/1999 | Moody et al. |
| 5,980,384 A | 11/1999 | Barrie |
| 5,984,779 A | 11/1999 | Bridgeman et al. |
| 5,984,781 A | 11/1999 | Sunaga |
| 5,984,782 A | 11/1999 | Inoue |
| 5,989,121 A | 11/1999 | Sakamoto |
| 5,993,316 A | 11/1999 | Coyle et al. |
| 5,997,400 A | 12/1999 | Seelig et al. |
| 5,997,401 A | 12/1999 | Crawford |
| 6,001,016 A | 12/1999 | Walker et al. |
| 6,004,207 A | 12/1999 | Wilson, Jr. et al. |
| 6,007,066 A | 12/1999 | Moody |
| 6,007,427 A | 12/1999 | Wiener |
| 6,012,982 A | 1/2000 | Piechowiak et al. |
| 6,012,983 A | 1/2000 | Walker et al. |
| 6,015,344 A | 1/2000 | Kelly et al. |
| 6,015,346 A | 1/2000 | Bennett |
| 6,016,338 A | 1/2000 | Bansal et al. |
| 6,019,369 A | 2/2000 | Nakagawa et al. |
| 6,019,374 A | 2/2000 | Breeding |
| 6,033,307 A | 3/2000 | Vancura |
| 6,039,648 A | 3/2000 | Guinn et al. |
| 6,039,649 A | 3/2000 | Schulze |
| 6,045,129 A | 4/2000 | Cooper et al. |
| 6,047,963 A | 4/2000 | Pierce et al. |
| 6,048,269 A | 4/2000 | Burns et al. |
| 6,050,895 A | 4/2000 | Luciano et al. |
| 6,056,642 A | 5/2000 | Bennett |
| 6,059,289 A | 5/2000 | Vancura |
| 6,059,658 A | 5/2000 | Mangano et al. |
| 6,062,979 A | 5/2000 | Inoue |
| 6,062,980 A | 5/2000 | Luciano |
| 6,062,981 A | 5/2000 | Luciano, Jr. |
| 6,068,553 A | 5/2000 | Parker |
| 6,077,162 A | 6/2000 | Weiss |
| 6,080,062 A | 6/2000 | Olson |
| 6,082,887 A | 7/2000 | Feuer et al. |
| 6,086,066 A | 7/2000 | Takeuchi et al. |
| 6,089,975 A | 7/2000 | Dunn |
| 6,089,976 A | 7/2000 | Schneider et al. |
| 6,089,977 A | 7/2000 | Bennett |
| 6,089,978 A | 7/2000 | Adams |
| 6,089,980 A | 7/2000 | Gauselmann |
| 6,093,102 A | 7/2000 | Bennett |
| 6,099,408 A | 8/2000 | Schneier et al. |
| 6,102,400 A | 8/2000 | Scott et al. |
| 6,102,798 A | 8/2000 | Bennett |
| 6,105,962 A | 8/2000 | Malavazos et al. |
| 6,110,039 A | 8/2000 | Oh |
| 6,110,041 A | 8/2000 | Walker et al. |
| 6,110,043 A | 8/2000 | Olsen |
| 6,113,098 A | 9/2000 | Adams |
| 6,117,009 A | 9/2000 | Yoseloff |
| 6,117,013 A | 9/2000 | Eiba |
| 6,120,031 A | 9/2000 | Adams |
| 6,120,377 A | 9/2000 | McGinnis, Sr. et al. |
| 6,120,378 A | 9/2000 | Moody et al. |
| 6,126,541 A | 10/2000 | Fuchs |
| 6,126,542 A | 10/2000 | Fier |
| 6,126,547 A | 10/2000 | Ishimoto |
| 6,128,550 A | 10/2000 | Heidel et al. |
| 6,129,355 A | 10/2000 | Hahn et al. |
| 6,135,884 A | 10/2000 | Hedrick et al. |
| 6,135,885 A | 10/2000 | Lermusiaux |
| 6,139,013 A | 10/2000 | Pierce et al. |
| 6,142,872 A | 11/2000 | Walker et al. |
| 6,142,873 A | 11/2000 | Weiss et al. |
| 6,142,874 A | 11/2000 | Kodachi et al. |
| 6,142,875 A | 11/2000 | Kodachi et al. |
| 6,146,273 A | 11/2000 | Olsen |
| 6,149,156 A | 11/2000 | Feola |
| 6,149,157 A | 11/2000 | Suan |
| 6,149,521 A | 11/2000 | Sanduski |
| 6,152,823 A | 11/2000 | Lacoste et al. |
| 6,155,925 A | 12/2000 | Giobbi et al. |
| 6,159,095 A | 12/2000 | Frohm et al. |
| 6,159,096 A | 12/2000 | Yoseloff |
| 6,159,097 A | 12/2000 | Gura |
| 6,159,098 A | 12/2000 | Slomiany et al. |

(56) References Cited

U.S. PATENT DOCUMENTS

| | | |
|---|---|---|
| 6,162,121 A | 12/2000 | Morro et al. |
| 6,162,122 A | 12/2000 | Acres et al. |
| 6,165,070 A | 12/2000 | Nolte et al. |
| 6,165,071 A | 12/2000 | Weiss |
| 6,165,072 A | 12/2000 | Davis et al. |
| 6,168,520 B1 | 1/2001 | Baerlocher et al. |
| 6,168,521 B1 | 1/2001 | Luciano et al. |
| 6,168,523 B1 | 1/2001 | Piechowiak et al. |
| 6,173,955 B1 | 1/2001 | Perrie et al. |
| 6,174,233 B1 | 1/2001 | Sunaga et al. |
| 6,174,235 B1 | 1/2001 | Walker et al. |
| 6,183,366 B1 | 2/2001 | Goldberg et al. |
| 6,186,893 B1 | 2/2001 | Walker et al. |
| 6,186,894 B1 | 2/2001 | Mayeroff |
| 6,190,254 B1 | 2/2001 | Bennett |
| 6,190,255 B1 | 2/2001 | Thomas et al. |
| 6,193,606 B1 | 2/2001 | Walker et al. |
| 6,193,610 B1 | 2/2001 | Junkin |
| 6,203,010 B1 | 3/2001 | Jorasch et al. |
| 6,203,429 B1 | 3/2001 | Demar et al. |
| 6,203,430 B1 | 3/2001 | Walker et al. |
| 6,206,374 B1 | 3/2001 | Jones |
| 6,206,782 B1 | 3/2001 | Walker et al. |
| D441,031 S | 4/2001 | Seelig et al. |
| 6,210,275 B1 | 4/2001 | Olsen |
| 6,210,277 B1 | 4/2001 | Stefan |
| 6,210,279 B1 | 4/2001 | Dickinson |
| 6,213,876 B1 | 4/2001 | Moore, Jr. |
| 6,217,448 B1 | 4/2001 | Olsen |
| 6,220,593 B1 | 4/2001 | Pierce et al. |
| 6,220,959 B1 | 4/2001 | Holmes, Jr. et al. |
| 6,220,961 B1 | 4/2001 | Keane et al. |
| 6,224,482 B1 | 5/2001 | Bennett |
| 6,224,483 B1 | 5/2001 | Mayeroff |
| 6,224,484 B1 | 5/2001 | Okuda et al. |
| 6,224,486 B1 | 5/2001 | Walker et al. |
| 6,227,970 B1 | 5/2001 | Shimizu et al. |
| 6,227,971 B1 | 5/2001 | Weiss |
| 6,231,442 B1 | 5/2001 | Mayeroff |
| 6,231,445 B1 | 5/2001 | Acres |
| 6,234,879 B1 | 5/2001 | Hasegawa et al. |
| 6,234,897 B1 | 5/2001 | Frohm et al. |
| 6,238,287 B1 | 5/2001 | Komori et al. |
| 6,238,288 B1 | 5/2001 | Walker et al. |
| D443,313 S | 6/2001 | Brettschneider |
| 6,241,608 B1 | 6/2001 | Torango |
| 6,244,958 B1 | 6/2001 | Acres |
| 6,251,013 B1 | 6/2001 | Bennett |
| 6,254,481 B1 | 7/2001 | Jaffe |
| 6,254,483 B1 | 7/2001 | Acres |
| 6,257,981 B1 | 7/2001 | Acres et al. |
| 6,261,128 B1 | 7/2001 | Heim et al. |
| 6,261,177 B1 | 7/2001 | Bennett |
| 6,264,557 B1 | 7/2001 | Schneier et al. |
| 6,267,669 B1 | 7/2001 | Luciano, Jr. et al. |
| 6,270,409 B1 | 8/2001 | Shuster |
| 6,270,411 B1 | 8/2001 | Gura et al. |
| 6,270,412 B1 | 8/2001 | Crawford et al. |
| 6,273,820 B1 * | 8/2001 | Haste, III .................. 463/40 |
| 6,287,202 B1 | 9/2001 | Pascal et al. |
| 6,293,866 B1 | 9/2001 | Walker et al. |
| RE37,414 E | 10/2001 | Harlick |
| 6,299,165 B1 | 10/2001 | Nagano |
| 6,299,170 B1 | 10/2001 | Yoseloff |
| 6,302,398 B1 | 10/2001 | Vecchio |
| 6,302,790 B1 | 10/2001 | Brossard |
| 6,302,793 B1 | 10/2001 | Fertitta, III et al. |
| 6,305,686 B1 | 10/2001 | Perrie et al. |
| 6,309,298 B1 | 10/2001 | Gerow |
| 6,309,299 B1 | 10/2001 | Weiss |
| 6,309,300 B1 | 10/2001 | Glavich |
| 6,309,307 B1 | 10/2001 | Krause et al. |
| 6,311,976 B1 | 11/2001 | Yoseloff et al. |
| 6,312,330 B1 | 11/2001 | Jones et al. |
| 6,312,332 B1 | 11/2001 | Walker et al. |
| 6,312,333 B1 | 11/2001 | Acres |
| 6,312,334 B1 | 11/2001 | Yoseloff |
| 6,315,660 B1 | 11/2001 | DeMar et al. |
| 6,315,662 B1 | 11/2001 | Jorasch et al. |
| 6,315,663 B1 | 11/2001 | Sakamoto |
| 6,315,664 B1 | 11/2001 | Baerlocher et al. |
| 6,319,122 B1 | 11/2001 | Packes, Jr. et al. |
| 6,319,123 B1 | 11/2001 | Paludi |
| 6,319,124 B1 | 11/2001 | Baerlocher et al. |
| 6,319,125 B1 | 11/2001 | Acres |
| 6,322,078 B1 | 11/2001 | Adams |
| 6,322,309 B1 | 11/2001 | Thomas et al. |
| 6,328,649 B1 | 12/2001 | Randall et al. |
| 6,334,814 B1 | 1/2002 | Adams |
| 6,336,857 B1 | 1/2002 | McBride |
| 6,336,860 B1 | 1/2002 | Webb |
| 6,336,863 B1 | 1/2002 | Baerlocher et al. |
| 6,338,678 B1 | 1/2002 | Seelig et al. |
| 6,340,158 B2 | 1/2002 | Pierce et al. |
| 6,343,989 B1 | 2/2002 | Wood et al. |
| 6,346,043 B1 | 2/2002 | Colin et al. |
| 6,347,738 B1 | 2/2002 | Crevelt et al. |
| 6,347,996 B1 | 2/2002 | Gilmore et al. |
| 6,358,144 B1 | 3/2002 | Kadlic et al. |
| 6,358,149 B1 | 3/2002 | Schneider et al. |
| 6,361,441 B1 | 3/2002 | Walker et al. |
| 6,364,765 B1 | 4/2002 | Walker et al. |
| 6,364,766 B1 | 4/2002 | Anderson et al. |
| 6,364,767 B1 | 4/2002 | Brossard et al. |
| 6,364,768 B1 | 4/2002 | Acres et al. |
| 6,364,769 B1 | 4/2002 | Weiss et al. |
| 6,368,216 B1 | 4/2002 | Hedrick et al. |
| 6,368,218 B2 | 4/2002 | Angell, Jr. |
| 6,371,852 B1 | 4/2002 | Acres |
| 6,375,187 B1 | 4/2002 | Baerlocher |
| 6,375,567 B1 | 4/2002 | Acres |
| 6,375,568 B1 | 4/2002 | Roffman et al. |
| 6,375,569 B1 | 4/2002 | Acres |
| 6,375,570 B1 | 4/2002 | Poole |
| 6,386,974 B1 | 5/2002 | Adams |
| 6,386,977 B1 | 5/2002 | Hole |
| 6,398,218 B1 | 6/2002 | Vancura |
| 6,398,220 B1 | 6/2002 | Inoue |
| 6,398,644 B1 | 6/2002 | Perrie et al. |
| 6,398,645 B1 | 6/2002 | Yoseloff |
| 6,406,369 B1 | 6/2002 | Baerlocher et al. |
| 6,413,161 B1 | 7/2002 | Baerlocher et al. |
| 6,416,408 B2 | 7/2002 | Tracy et al. |
| 6,585,591 B1 | 7/2003 | Baerlocher et al. |
| 6,632,140 B2 | 10/2003 | Berman et al. |
| 6,634,943 B1 | 10/2003 | Baerlocher |
| 6,634,945 B2 | 10/2003 | Glavich et al. |
| 6,733,386 B2 | 5/2004 | Cuddy et al. |
| 6,910,962 B2 | 6/2005 | Marks et al. |
| 7,056,213 B2 | 6/2006 | Ching et al. |
| 2001/0004609 A1 | 6/2001 | Walker et al. |
| 2001/0024971 A1 | 9/2001 | Brossard |
| 2001/0036865 A1 | 11/2001 | Neal, III |
| 2001/0049303 A1 | 12/2001 | Found |
| 2001/0055990 A1 | 12/2001 | Acres |
| 2002/0002674 A1 | 1/2002 | Grimes et al. |
| 2002/0028707 A1 | 3/2002 | Pascal et al. |
| 2002/0032052 A1 | 3/2002 | Levitan |
| 2002/0039923 A1 | 4/2002 | Cannon et al. |
| 2002/0042296 A1 | 4/2002 | Walker et al. |
| 2002/0045472 A1 | 4/2002 | Adams |
| 2002/0045475 A1 | 4/2002 | Glavich et al. |
| 2002/0071557 A1 | 6/2002 | Nguyen |
| 2002/0151342 A1 | 10/2002 | Tracy et al. |
| 2002/0183105 A1 * | 12/2002 | Cannon et al. .................. 463/16 |
| 2003/0186745 A1 * | 10/2003 | Nguyen et al. .................. 463/42 |

FOREIGN PATENT DOCUMENTS

| | | |
|---|---|---|
| AU | 567001 | 11/1987 |
| AU | 585160 | 6/1989 |
| AU | 589158 | 10/1989 |
| AU | 593059 | 2/1990 |
| AU | 630112 | 3/1990 |

(56) References Cited

FOREIGN PATENT DOCUMENTS

| | | |
|---|---|---|
| AU | 628330 | 9/1992 |
| AU | 633469 | 1/1993 |
| AU | 649009 | 5/1994 |
| AU | 655801 | 1/1995 |
| AU | 1996 70247 | 4/1997 |
| AU | 680920 | 8/1997 |
| AU | 1997 16432 | 9/1997 |
| AU | 1997 17601 B2 | 9/1997 |
| AU | 1996 50327 | 10/1997 |
| AU | 1997 47657 B2 | 6/1998 |
| AU | 1997 43615 | 7/1998 |
| AU | 1998 63553 A | 10/1998 |
| AU | 1998 84162 A1 | 3/1999 |
| AU | 707687 | 7/1999 |
| AU | 1999 17318 A1 | 9/1999 |
| AU | 709724 | 9/1999 |
| AU | 711501 | 10/1999 |
| AU | 716299 | 2/2000 |
| AU | 721968 | 7/2000 |
| AU | 722107 | 7/2000 |
| AU | 728788 | 1/2001 |
| AU | 2001 1000032 B4 | 11/2001 |
| AU | 2001 1000033 B4 | 11/2001 |
| AU | 748263 | 5/2002 |
| AU | 749222 | 6/2002 |
| AU | 1999 43453 C | 4/2003 |
| DE | 3415114 | 11/1985 |
| DE | 8710757 | 11/1987 |
| DE | 3638100 | 11/1988 |
| DE | 3917683 | 12/1990 |
| DE | 4200254 | 8/1993 |
| DE | 4301855 | 7/1994 |
| DE | 19600787 C2 | 5/1997 |
| DE | 19613455 C2 | 8/1997 |
| DE | 19936196 A1 | 1/2001 |
| DE | 3700861 A1 | 8/2004 |
| EP | 0 342 797 | 11/1989 |
| EP | 0 444 932 | 2/1991 |
| EP | 0 449 433 A2 | 10/1991 |
| EP | 0 798 676 A1 | 10/1997 |
| EP | 0 874 337 A1 | 10/1998 |
| EP | 0 926 645 A2 | 6/1999 |
| EP | 0 944 030 A2 | 9/1999 |
| EP | 0 945 837 A2 | 9/1999 |
| EP | 0 981 119 A2 | 2/2000 |
| EP | 0 984 408 A2 | 3/2000 |
| EP | 0 984 409 A2 | 3/2000 |
| EP | 1 003 138 A2 | 5/2000 |
| EP | 0984407 A2 | 8/2000 |
| GB | 912 685 | 12/1962 |
| GB | 2 083 936 A | 3/1982 |
| GB | 2 096 376 A | 10/1982 |
| GB | 2 097 160 A | 10/1982 |
| GB | 2 100 905 A | 1/1983 |
| GB | 2 117 155 A | 10/1983 |
| GB | 2 117 952 A | 10/1983 |
| GB | 2 118 445 | 11/1983 |
| GB | 2 144 644 A | 3/1984 |
| GB | 2 137 392 A | 10/1984 |
| GB | 2 139 390 | 11/1984 |
| GB | 2 142 457 A | 1/1985 |
| GB | 2 147 773 | 5/1985 |
| GB | 2 148 135 | 5/1985 |
| GB | 1 151 054 A | 7/1985 |
| GB | 2 153 572 A | 8/1985 |
| GB | 2 161 008 A | 1/1986 |
| GB | 2 161 009 A | 1/1986 |
| GB | 2 170 636 A | 8/1986 |
| GB | 2 180 682 A | 4/1987 |
| GB | 2 181 589 A | 4/1987 |
| GB | 2 183 882 A | 6/1987 |
| GB | 2 201 821 A | 9/1987 |
| GB | 2 191 030 A | 12/1987 |
| GB | 2 222 712 A | 3/1990 |
| GB | 2 226 436 A | 6/1990 |
| GB | 2 226 907 A | 7/1990 |
| GB | 2 231 189 | 11/1990 |
| GB | 2 282 690 | 4/1995 |
| GB | 2 322 217 A | 8/1998 |
| GB | 2 333 880 A | 9/1998 |
| GB | 2 328 311 | 2/1999 |
| GB | 2 353 128 A | 2/2001 |
| GB | 2 383 668 A | 11/2001 |
| JP | 7148307 | 6/1995 |
| JP | H1085457 A † | 4/1998 |
| JP | 2000107453 A † | 4/2000 |
| WO | WO 94 12256 | 6/1994 |
| WO | WO 95 22811 | 8/1995 |
| WO | WO 95 30944 | 11/1995 |
| WO | WO 97 12338 | 4/1997 |
| WO | WO 97 27568 | 7/1997 |
| WO | WO 97 32285 | 9/1997 |
| WO | WO 98 00210 | 1/1998 |
| WO | WO 98 35309 | 8/1998 |
| WO | WO 98 47115 | 10/1998 |
| WO | WO 98 51384 | 11/1998 |
| WO | WO 99 03078 | 1/1999 |
| WO | WO 99 10849 | 3/1999 |
| WO | WO 00 12186 | 3/2000 |
| WO | WO 00/20082 | 4/2000 |
| WO | WO 00 32286 | 6/2000 |
| WO | WO 00 66235 | 11/2000 |
| WO | WO 00 76606 | 12/2000 |
| WO | WO 01 10523 | 2/2001 |
| WO | WO 01 15055 | 3/2001 |
| WO | WO 01 15790 A1 | 3/2001 |
| WO | WO 01 26019 | 4/2001 |
| WO | WO 02/096528 A2 | 12/2002 |

OTHER PUBLICATIONS

EP Preliminary Opinion of the Examining Division, dated May 3, 2006, from corresponding EP Application No. 03731579.3 (5 pages).
EP Office Action dated Jun. 6, 2005, from corresponding EP Application No. 03731579.3 (3 pages).
U.S. Appl. No. 09/595,798, filed 6116/2000 entitled, "Using a Gaming Machine as a Server."
U.S. Appl. No. 09/515,717, filed Feb. 29, 2000 entitled, Name Your Prize Gaming Methodology.
U.S. Appl. No. 09/553,437, filed Apr. 19, 2000 entitled, "Parallel Games on a Gaming Machine."
U.S. Appl. No. 09/553,438, filed Apr. 19, 2000 entitled, "Video Pachinko on a Video Platform as a Gaming Machine."
Examination Report dated Sep. 1, 2008 for corresponding Australian Patent Application No. 2003240563.

\* cited by examiner
† cited by third party

For $X_{Rm}, 0 \le X_R \le 1$ and For m, $1 \le m \le N$

Round 1 (R1)
$P_{ELIM}(R1) = X_{R1}$

Round 2 (R2)
$P_{ELIM}(R2) = X_{R2}$

Round N (RN)
$P_{ELIM}(RN) = X_{RN}$ $P_{SURVIVE}(R1) = 1 - X_{R1}$ $P_{SURVIVE}(R2) = \{1 - P_{ELIM}(R1)\} \cdot \{1 - P_{ELIM}(R2)\}$ $= \{1 - X_{R1}\} \cdot \{1 - X_{R2}\}$ $P_{SURVIVE} = \{1 - P_{ELIM}(R1)\} \cdot \{1 - P_{ELIM}(R2)\} \cdot \ldots \cdot \{1 - P_{ELIM}(RN-1)\} \cdot \{1 - P_{ELIM}(RN)\}$ $= \{1 - X_{R1}\} \cdot \{1 - X_{R2}\} \cdot \ldots \cdot \{1 - X_{RN-1}\} \cdot \{1 - X_N\}$

| ROUND 1 AFTER ELIMINATION TEST | ROUND 2 AFTER ELIMINATION TEST | ROUND 3 AFTER ELIMINATION TEST | ROUND 4 AFTER ELIMINATION TEST | ROUND 5 AFTER ELIMINATION TEST | ROUND 6 AFTER ELIMINATION TEST |
|---|---|---|---|---|---|
| $P_{ELIM}(R1)=1/2$ $P_{SURVIVE}(R1)=1/2$ | $P_{ELIM}(R2)=1/2$ $P_{SURVIVE}(R2)=1/4$ | $P_{ELIM}(R3)=1/2$ $P_{SURVIVE}(R3)=1/8$ | $P_{ELIM}(R4)=1/2$ $P_{SURVIVE}(R4)=1/16$ | $P_{ELIM}(R5)=1/2$ $P_{SURVIVE}(R5)=1/32$ | $P_{ELIM}(R6)=1/2$ $P_{SURVIVE}(R6)=1/64$ |

FIGURE 2A

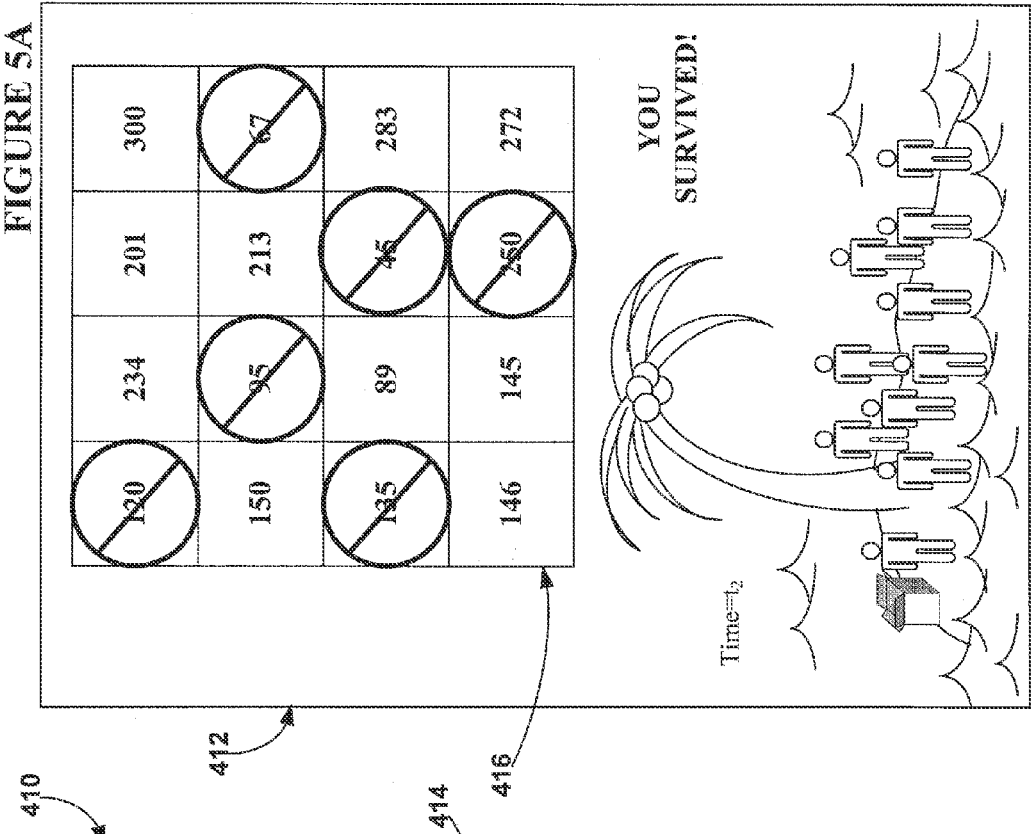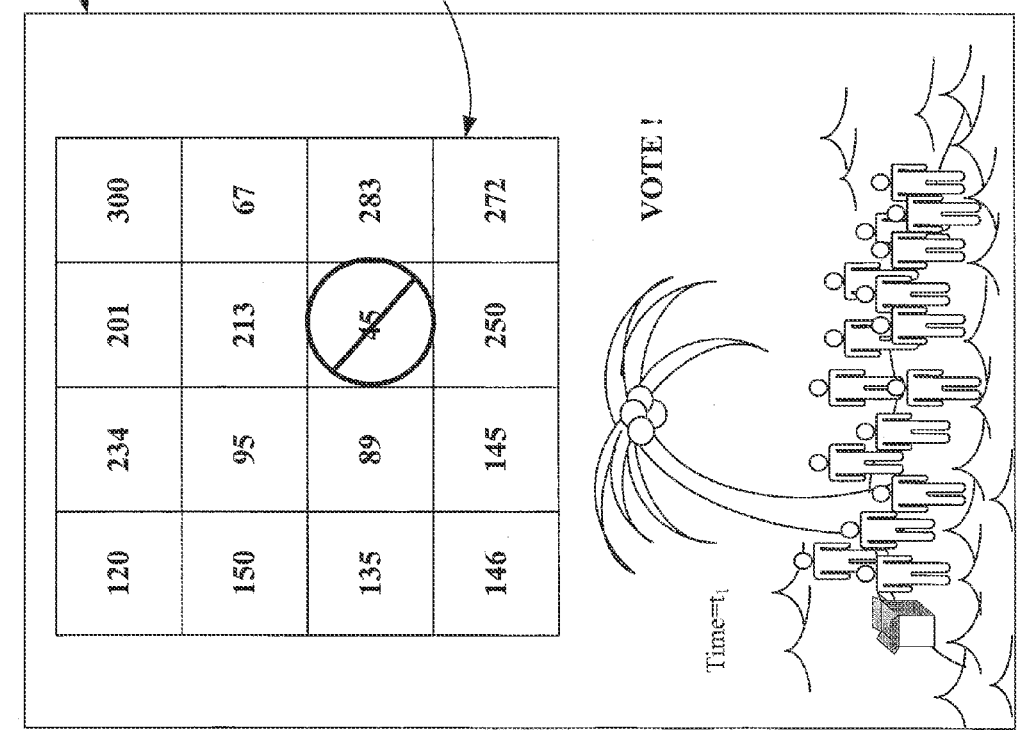

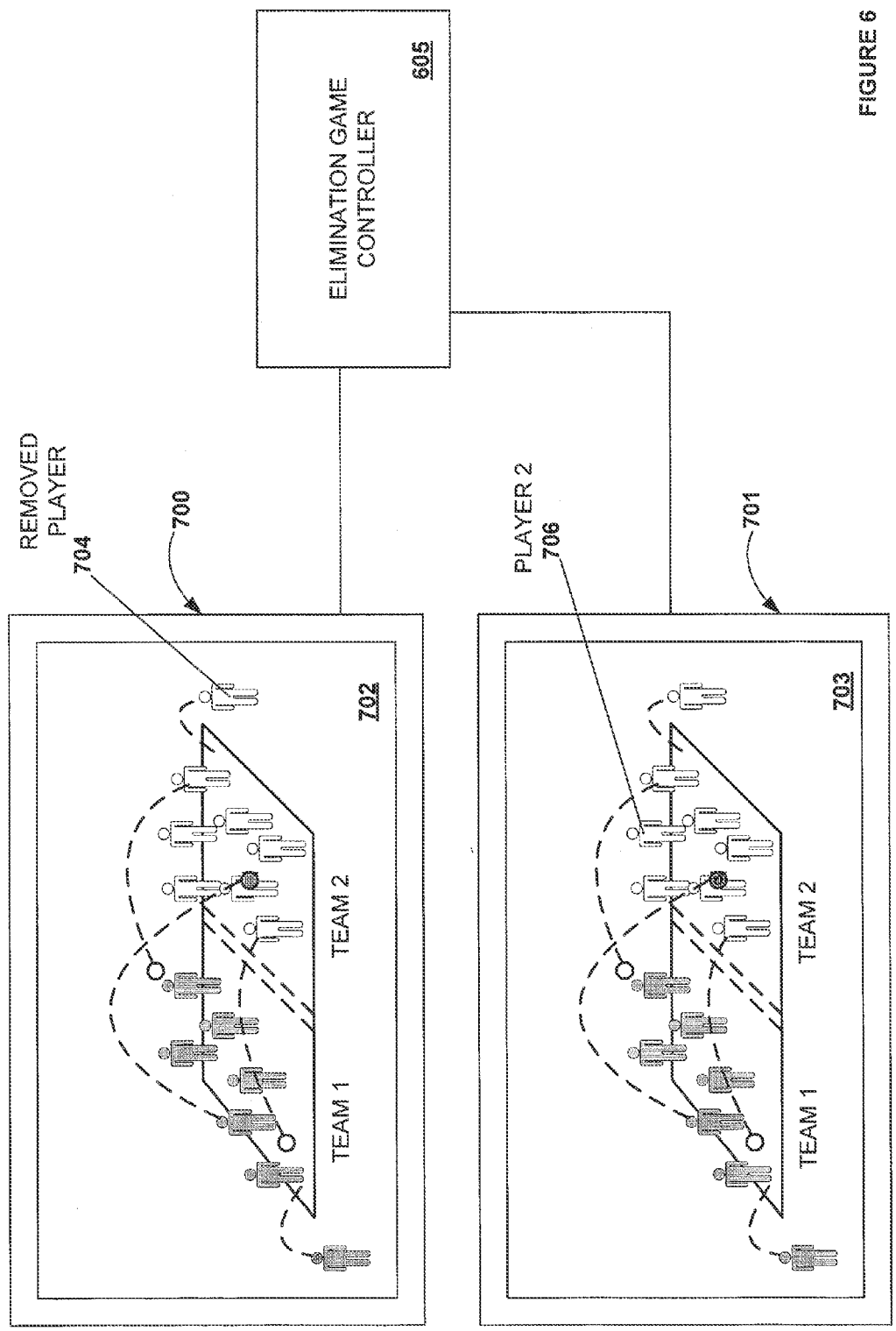

ELIMINATION GAMES FOR GAMING MACHINES

PRIORITY CLAIM

This application is a divisional of, and claims priority to and the benefit of, U.S. patent application Ser. No. 12/341,736, filed on Dec. 22, 2008, which is a continuation of, and claims priority to and the benefit of, U.S. patent application Ser. No. 10/176,171, filed on Jun. 19, 2002, now U.S. Pat. No. 7,485,043, the entire contents of each of which are incorporated herein by reference.

BACKGROUND

The present disclosure relates to game playing methods for gaming machines such as slot machines and video poker machines. More particularly, the present disclosure relates to methods of allowing game players to play elimination games on a gaming machine.

There are a wide variety of devices that can comprise a gaming machine such as a slot machine or video poker machine. Some examples of these devices are lights, slot reels, ticket printers, card readers, speakers, bill validators, coin acceptors, display panels, key pads, bonus wheels, and button pads. These devices provide many of the features which allow a gaming machine to present a game. Some of these devices are built into the gaming machine. Often, a number of devices are grouped together in a separate box that is placed on top of the gaming machine. Devices of this type are commonly called a top box.

Typically, utilizing a master gaming controller, the gaming machine controls various combinations of devices that allow a player to play a game of chance on the gaming machine and also encourage game play on the gaming machine. For example, a game played on a gaming machine usually requires a player to input money or indicia of credit into the gaming machine, indicate a wager amount, and initiate a game play. These steps require the gaming machine to operate input devices including bill validators and coin acceptors to accept money into the gaming machine and recognize user inputs from devices including key pads and button pads to determine the wager amount and initiate game play.

After a game of chance has been initiated on the gaming machine, the gaming machine determines a game outcome and presents the outcome of the game to a player. For example, for a slot game, after a player has initiated a game by pressing an input button or pulling a handle attached to the gaming machine, the gaming machine determines a game outcome which is the final position of each reel on the slot machine. A requirement for most gaming machines is that the probability of each game outcome is precisely known and remains constant during game play. Thus, when a player plays two or more games on a gaming machine the probability of a particular game outcome is the same for each game that the player initiates.

After the gaming machine determines the game outcome, the outcome of the game is presented to the player. For the slot game, the game outcome presentation might include a number reels spinning, visual effects including flashing or strobing lights and auditory effects including bells and whistles. The game outcome presentation, including the various visual and auditory effects, is designed to add excitement to the game being played on the gaming machine and encourage additional game play.

Usually near the end of the game outcome presentation, game outcome is presented. For example, for the slot game, the reels stop at a final position. Based on the game outcome, the gaming machine may notify the player of an award of a varying amount or notify the player that the wager made on the game was lost. For example, for a slot game with three slot reels, when the final position of each reel corresponds to the display of an identical symbol including three cherries, three bars or the like, a player might be awarded a credit of 5 times the initial wager made on the game. However, other symbol combinations including 2 cherries and a bar or two bars and a cherry might result in a loss of the wager made on the game. Further, each time a player plays a game the probability of a particular game outcome such as three cherries or three bars will usually be the same. After the game outcome has been presented, a player may initiate a new game by making a new wager on the gaming machine and initiating the next game play.

In addition to the game of chance on the gaming machine on the gaming machine, a player may also be presented a bonus game. The bonus game may be used to add additional excitement to the play of games on the gaming machine. In bonus games, which are particular popular with video slot games, the player is offered the chance to win an additional award amount. The bonus game may be triggered by different events that occur during the play of the game of chance. For instance, in a slot game, a particular symbol or combination of symbols appearing on the reels may trigger the bonus game.

The bonus game may incorporate additional animations that are displayed on one or more video displays on the gaming machine and the activation of one or more peripheral devices associated with the gaming machine. For example, Wheel-of-Fortune™ by IGT (Reno, Nev.) is a very popular bonus game that incorporates a large spinning wheel attached to the gaming machine. When the bonus game is triggered, the wheel spins up. The bonus may be awarded according to the stopping place of the wheel.

The amount of game play on a gaming machine is usually a function of the type of game of chance. A few examples of games that are played on video gaming machines are slot games, poker, black jack, and keno. Among these games, slot games and video poker are probably the most popular. The type of bonus games offered with the game of chance may also influence the popularity of a particular game. A casino typically offers various types of games and bonus games because many game players are attracted to some games but dislike others. When a player wants to play a game on a gaming machine but does not like any of the offered games, this person may choose not to play. Also, when a player finds a particular game only mildly exciting, the player may become disinterested after a short time and cease their game play. Thus, to increase game play, new games of chance and bonus games are desired that may attract players previously uninterested in game play on a gaming machine. Accordingly, to attract new players, new games for gaming machines are desired that are exciting and are interesting enough to hold a player's interest over a long period of time.

SUMMARY

The present disclosure addresses the needs indicated above by providing an elimination game that may be played on a stand-alone gaming machine or that may be played on a group of gaming machines linked together. The elimination game is played by plurality of entities where each entity may comprise one or more virtual players or real players. The real players may pay a participation fee to play the elimination game. During the elimination game, the entities play one or more games that are provided as part of the elimination game.

For example, video slot games and video poker games may be used for the game play in the elimination game. One or more elimination tests may be applied to the entities using results from the game play. When conditions used in the elimination tests are met for one of the entities, the entity is removed from the elimination game before reaching the finish of the elimination game. Entities that avoid elimination and reach the finish of the elimination may receive an award.

One aspect of the present disclosure is a method of providing an elimination game on one or more gaming machines. The elimination game method may be generally characterized as comprising: (i) enrolling a plurality of entities for the elimination game where each entity comprises one or more players; (ii) receiving a participation fee for the elimination game from at least one of the players; (iii) between a start of the elimination game and a finish of the elimination game, generating at least one elimination game round, the one elimination game round comprising: (a) providing a game that is played by a number of the plurality entities; (b) based upon results of the game, applying an elimination test to each entity of the number of plurality of entities; (c) for each entity of the number of plurality of entities, when one or more conditions of the elimination test are met, removing the entity from the elimination game before the entity has reached the finish of the elimination game; and (iv) indicating a finishing award to at least one of the entities that has reached the finish of the elimination game and has satisfied the conditions necessary to earn the finishing award.

In particular embodiments of the present disclosure, the composition of the entities may vary. For example, each of the plurality of entities may comprise a single player. The single player may be a virtual player. In the elimination game, entities may comprise a plurality of players or entities may comprise only a single player where entities with multiple players and entities with a single player may play the elimination game at the same time. In entities with multiple players, all the players may be real players, all the players may be virtual players or the players may be a mixture of real players and virtual players.

For entities with a plurality of players, the elimination game method may also comprise providing a game that is played by each player; based upon results of the game, applying an elimination test to each of the players; when one or more conditions of the elimination test are met, removing the player from the elimination game before the player has reached the finish of the elimination game. In addition, when players are removed from entities with the plurality of players, the method may also comprise: 1) removing one player in the plurality of players of a first entity from the elimination game and not removing the first entity from the elimination game, 2) after removing the one player from the first entity, providing a game that is played by a number of players remaining in the first entity and indicating an award for the number of players remaining in the first entity and the one removed player, 3) removing one player in the plurality of players of a first entity from the elimination game and removing the first entity from the elimination game. Depending on the rules of the elimination game, the participation fee to play the elimination game may increase as a number of players in an entity increases. For instance, when increasing the number of players in an entity provides an advantage in the elimination game, the participation fee may increase as the number of players in the entity increases.

In other embodiments, the participation fee may be a wager on an outcome of the elimination game, a buy-in for an elimination game tournament or a wager for a game of chance played on one of the gaming machines where the elimination game is a bonus game triggered from the game of chance. The game of chance may be selected from the group consisting of slot games, poker games, pachinko games, multiple hand poker games, pai-gow poker games, black jack games, keno games, bingo games, roulette games, craps games and card games. Further, the elimination game method may also comprise: after removing a first entity from the elimination game and prior to the finish of the elimination game, adding the first entity back into the elimination game where the first entity is added back into the elimination for an additional participation fee.

In yet other embodiments of the present disclosure, the number of entities enrolled in the elimination game may affect the probability of one of the entities reaching the finish of the elimination game. For instance, the elimination game method may also comprise: 1) selecting a total number of entities at the start of the elimination game and 2) enrolling a number of real entities; and enrolling a number of virtual entities where the total number of entities is equal to the number of enrolled real entities and the number of enrolled virtual entities. The total number of entities selected at the start of the elimination game may increase the probability of reaching the finish of the elimination game for one or more of the entities. Also, depending on the rules of the elimination game, the total number of entities selected at the start of the elimination game may decrease the probability of reaching the finish of the elimination game for one or more of the entities.

An elimination game may comprise at least one elimination game round but may also comprise a plurality of elimination game rounds. In some embodiments, the number of plurality of entities in the at least one elimination game round may be all of the plurality of entities enrolled in the elimination game or a subset of the plurality of entities enrolled in the elimination game. In an elimination game with a plurality of elimination game rounds, the elimination game method may also comprise one or more of the following: 1) in a first elimination game round, applying the elimination test to all of the number of plurality entities; determining a number of remaining entities in the elimination game; and advancing simultaneously, the remaining entities to a next elimination game round, 2) in a first elimination game round with at least a first entity and a second entity, applying the elimination test to a first entity; advancing the first entity to a next elimination game round and while the second entity is playing a first game in the first elimination game round, providing a second game that is played by the first entity in the next elimination game round, and 3) in a first elimination game round, providing a first game that is played by a first entity; and in a second elimination game round, providing a second game that is played by the first entity.

The elimination game method may utilize different methods of providing awards. For instance, the elimination game method may also comprise: a) generating an outcome for a first game played by a first entity; b) indicating an award amount for the first game; c) storing the award amount; and d) when the first entity reaches a stage in the elimination game, awarding the stored award amount to the first entity. As another example, the elimination game method may also comprise: (i) generating an outcome for a plurality of games played by the first entity; (ii) indicating an award amount for each of the plurality of games, (iii) accumulating the award amounts for the plurality of games; and (iv) when the first entity reaches a stage in the elimination game, awarding the accumulated award amount to the first entity. In yet another example, the elimination game method may comprise: 1) applying the elimination test to a first entity in one of the elimination game rounds; and 2) when the first entity is not removed from the elimination game, indicating an award amount. Also, the method may include: 3) storing the award amount; and 4) when the first entity reaches a stage in the elimination game, awarding the stored award amount to the first entity. For each of the examples described above, the stage in the elimination game where the award amount is awarded may be the finish of the elimination game, the finish of one of the elimination game rounds or another stage in the game.

In another embodiment, supplemental wagers may be made during the elimination game. For instance, the elimination game method may also comprise: (a) receiving a wager separate from the participation fee from a first entity on an outcome of a game provided to the first entity in the at least one elimination game round; (b) determining the outcome of the game; (c) indicating an award amount based upon the outcome of the game; and (e) providing the award amount to the first entity.

In other embodiments of the present disclosure, the elimination game method may allow a player the opportunity to bank an award amount and possibly end the elimination game. For example, the elimination game method may comprise: during one of the elimination game rounds, (i) indicating an award amount for a first entity; (ii) offering the first entity a chance to bank the award amount and to exit the elimination game. In addition, the method may comprise one of: iii) receiving a request from the first entity to bank the award amount; banking the award amount to the first entity; and removing the first entity from the elimination game or iv) receiving a request from the first entity to continue in the elimination game; and continuing the elimination game for the first entity.

In yet another embodiment of the present disclosure, the elimination game method may allow for progressive jackpots. For instance, the elimination game method may comprise: i) prior to the finish of the elimination game, removing all of the entities from the elimination game (ii) adding a portion of the participation fee to a progressive jackpot. Although even without a progressive jackpot, all of the entities may be removed from the elimination game. Thus, the finishing award may include a portion of the participation fee and/or a progressive jackpot.

The elimination game methods of the present disclosure may involve different games and elimination strategies. For example, the game that is played by each entity may be selected from the group consisting of slot games, poker games, pachinko games, multiple hand poker games, pai-gow poker games, black jack games, keno games, bingo games, roulette games, craps games and card games. The game may vary from elimination game round to elimination game round. As another example, the elimination game method may comprise: a) in the game that is played by each entity, allowing a first entity to select a second entity for removal from the elimination game where a first condition of the elimination test for the second entity is to compare a random number to an elimination probability and when the random number is less than the elimination probability, the first condition of the elimination test is met. In some cases, the elimination probability may be 1.

Some other examples of conditions for the elimination test may be as follows. For instance, a first condition for the elimination test for a first entity may be to compare a random number to an elimination probability and when the random number is less than the elimination probability, the first condition of the elimination test may be met. The elimination probability may be in the range of 0 to 1. In a particular embodiment, the elimination probability may be about ½. As another example, a first condition of the elimination test for a first entity may be to compare a performance metric of the game played by the first entity with a fixed performance metric and when the performance metric is less than the fixed performance metric, the first condition may be met. Thus, the elimination game method may comprise prior to the play of the game by the first entity, selecting the fixed performance metric.

In some embodiments, the elimination test applied to each entity may be the same. In other embodiments, the elimination test applied to a first entity may be different than the elimination test applied to a second entity. The elimination test may be applied to a first entity a plurality of times. Further, the conditions of the elimination test may be the same each time the elimination test is applied or the conditions of the elimination test may vary each time the elimination test is applied. In one embodiment, the elimination test may be applied at timed intervals.

An elimination game generated using the elimination game method may be displayed on one or more gaming machines or different combinations of gaming machines. For example, the method may comprise one or more of the following: 1) displaying the elimination game on a display screen of a first gaming machine, 2) displaying the elimination game on a display screen of a first gaming machine and displaying the elimination game on a display screen on a second gaming machine, 3) providing a first game that is played by a first entity on a first gaming machine; providing a second game that is played by a second entity on a second gaming machine; displaying the first game and the second game on a display screen on the first gaming machine; and displaying the first game and the second game on a display screen on the second gaming machine.

Another aspect of the present disclosure provides a method for playing multiple elimination games on one or more gaming machines. The method may be generally characterized as comprising; 1) starting a first elimination on a first gaming machine; 2) while the first elimination game is being played, starting a second elimination game on the first gaming machine. The method may also comprise one or more of the following: a) displaying the first elimination game and the second elimination game on a display screen of the first gaming machine, b) displaying the first elimination game on a display screen on the first gaming machine and displaying the first elimination game on a display screen on a second gaming machine, c) displaying the second elimination game on the display screen on the first gaming machine and displaying the second elimination game on a display screen on a third gaming machine.

Another aspect of the present disclosure provides a gaming machine. The gaming machine may be generally characterized as comprising: 1) a master gaming controller designed to i) generate a game of chance played on the gaming machine and ii) generate an elimination game played on the gaming machine; 2) a display screen for displaying the game of chance and the elimination game. The game of chance may be selected from the group consisting of slot games, poker games, pachinko games, multiple hand poker games, pai-gow poker games, black jack games, keno games, bingo games, roulette games, craps games and card games.

In particular embodiments, the game of chance may be generated as part of the elimination game. The master gaming controller may be designed to generate a virtual entity in the elimination game. Further, the elimination game may be a bonus game triggered during the play of the game of chance.

The gaming machine may also comprise a communication interface used by the master gaming controller to communicate with remote gaming devices. The remote gaming devices may be at least one of a plurality of gaming machines, an elimination game server and combinations thereof. The elimination game may be played simultaneously on a plurality of gaming machines and the master gaming controller receives elimination game information via the communication interface from the plurality of gaming machines where elimination game information from the plurality of gaming machines is displayed on the display screen of the gaming machine.

Another aspect of the present disclosure provides a gaming system for playing an elimination game. The gaming system may be generally characterized as comprising: 1) an elimination game server and 2) a plurality of gaming machines. The elimination game server in the gaming system may be generally characterized as comprising: a) a first communication interface designed to communicate with the plurality of gaming machines via a network; b) an elimination game controller designed to: i) receive results of a game played on the plurality of gaming machines used in the elimination game via the first communication interface; ii) apply one more elimination tests used in the elimination game using the results of the game played on the plurality of gaming machines and iii) send an outcome of the one or more elimination tests to the plurality of gaming machines via the first communication interface. The plurality of gaming machine may each be generally characterized as comprising: a) a second communication interface, b) a master gaming controller designed to i) generate a game of chance played on the gaming machine separate from the elimination game, ii) generate the game played on the gaming machine used in the elimination game; and iii) send results of the game played on gaming machine used in the elimination game to the elimination game server; and c) a display screen for displaying the game of chance and the elimination game.

In particular embodiments, the elimination game server may, be a gaming machine. The elimination game controller may be further designed to iv) generate information for an elimination game scoreboard and v) send the information for the elimination game scoreboard to the plurality of gaming machines using the first communication interface. The master game controller is further designed to iv) receive the outcome of the one or more elimination tests from the elimination game server and v) generate a presentation for the outcome of the one or more elimination tests that is displayed on the display screen.

Another aspect of the present disclosure pertains to computer program products including a machine-readable medium on which is stored program instructions for implementing any of the methods described above. Any of the methods of the present disclosure may be represented as program instructions and/or data structures, databases, etc. that can be provided on such computer readable media. Yet another embodiment of the present disclosure is a system for delivering computer readable instructions, such as transmission, over a signal transmission medium, of signals representative of instructions for remotely administering any of the methods as described above.

These and other features of the present disclosure will be presented in more detail in the following detailed description and the associated figures.

BRIEF DESCRIPTION OF THE FIGURES

FIGS. 2A-2C are depictions of embodiments of elimination games of the present disclosure.

FIGS. 5A and 5B are block diagrams of an example of voting used in an elimination game.

FIG. 6 is block diagram of an example of an elimination game incorporating team play.

DETAILED DESCRIPTION

Figure 1A:
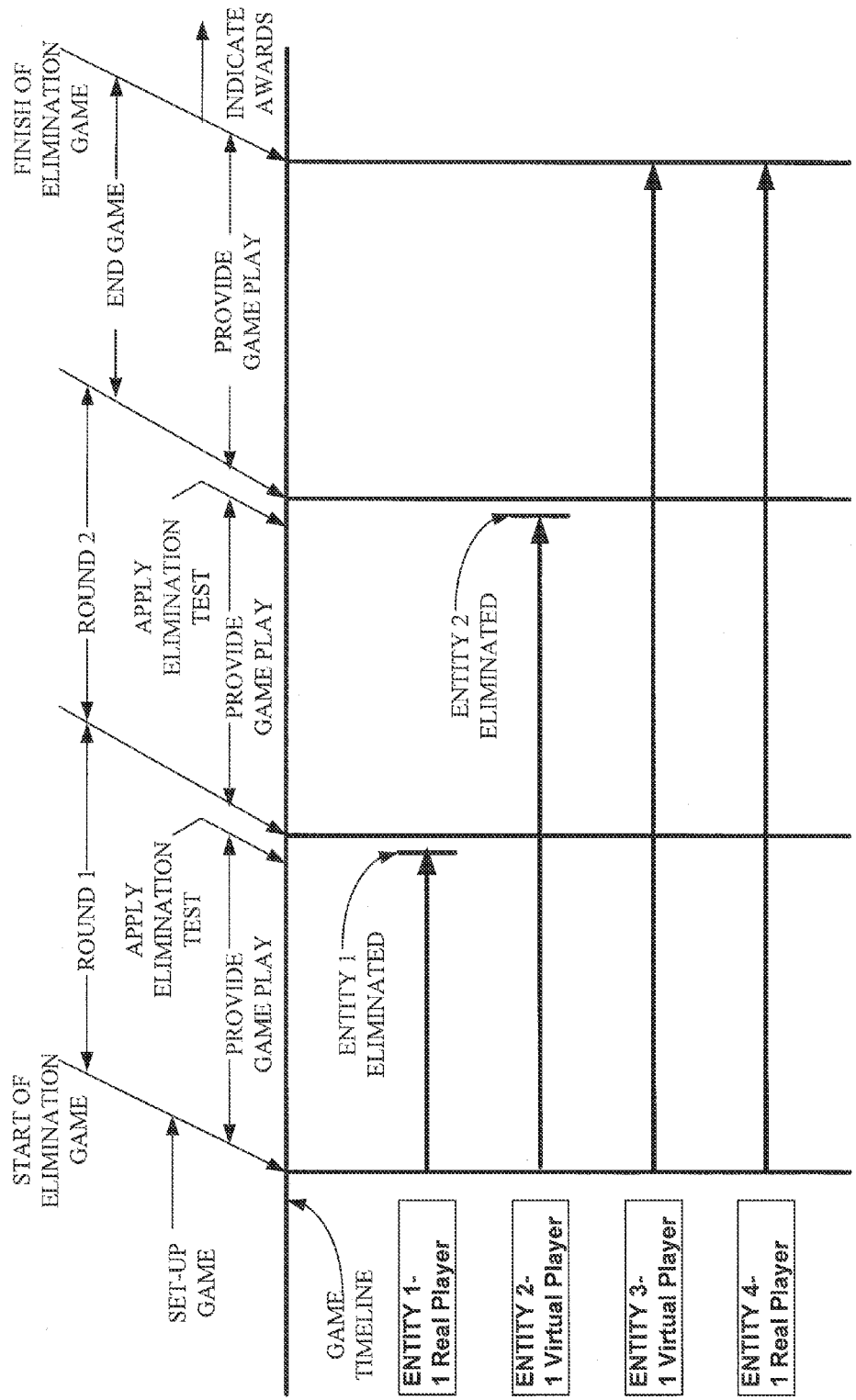
FIG. 1A is an example of time line for an elimination game with four entities.
Figure 1B:
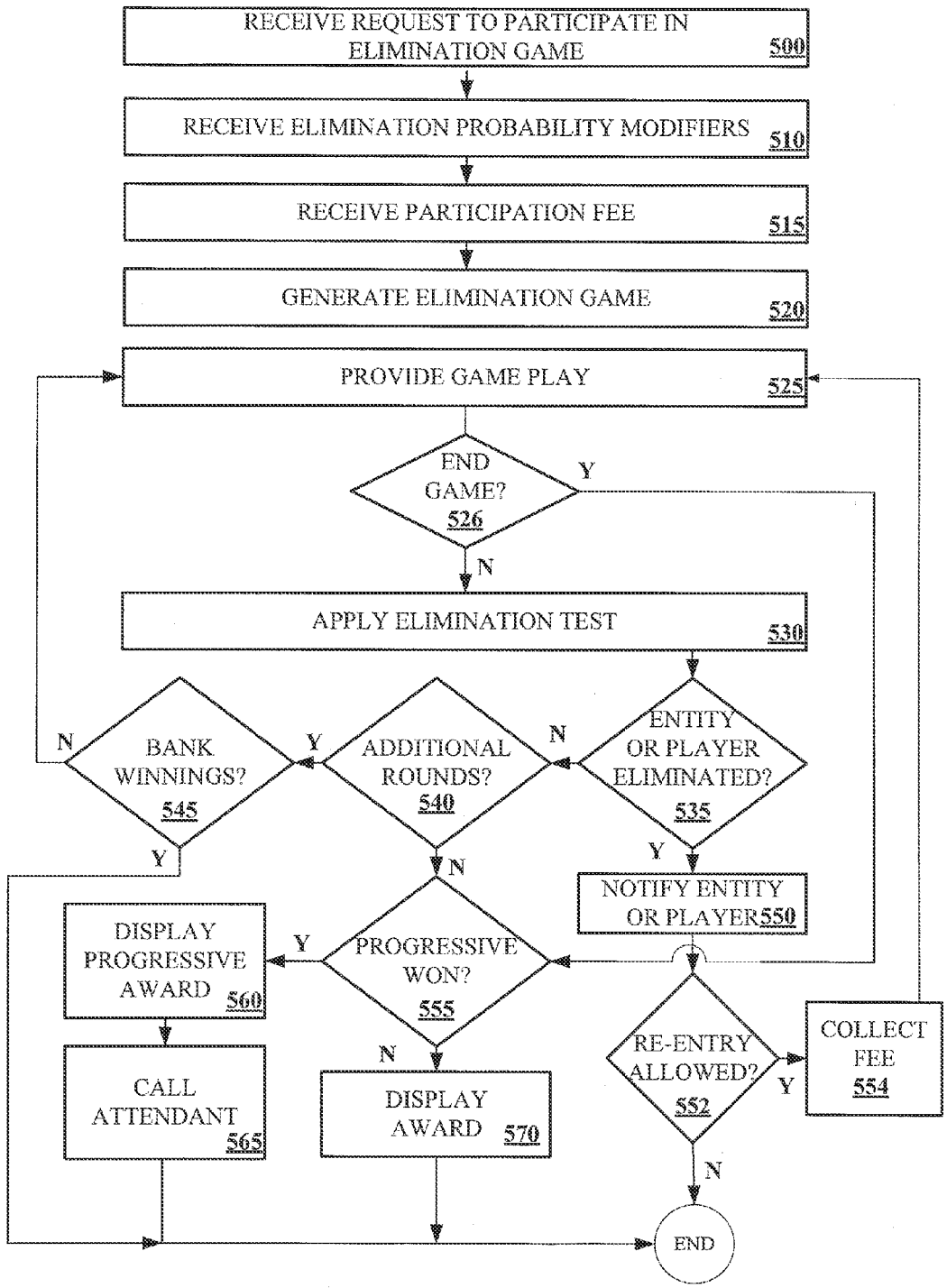
FIG. 1B is a flow chart depicting an elimination game playing methodology on a gaming machine.
Figure 2B:
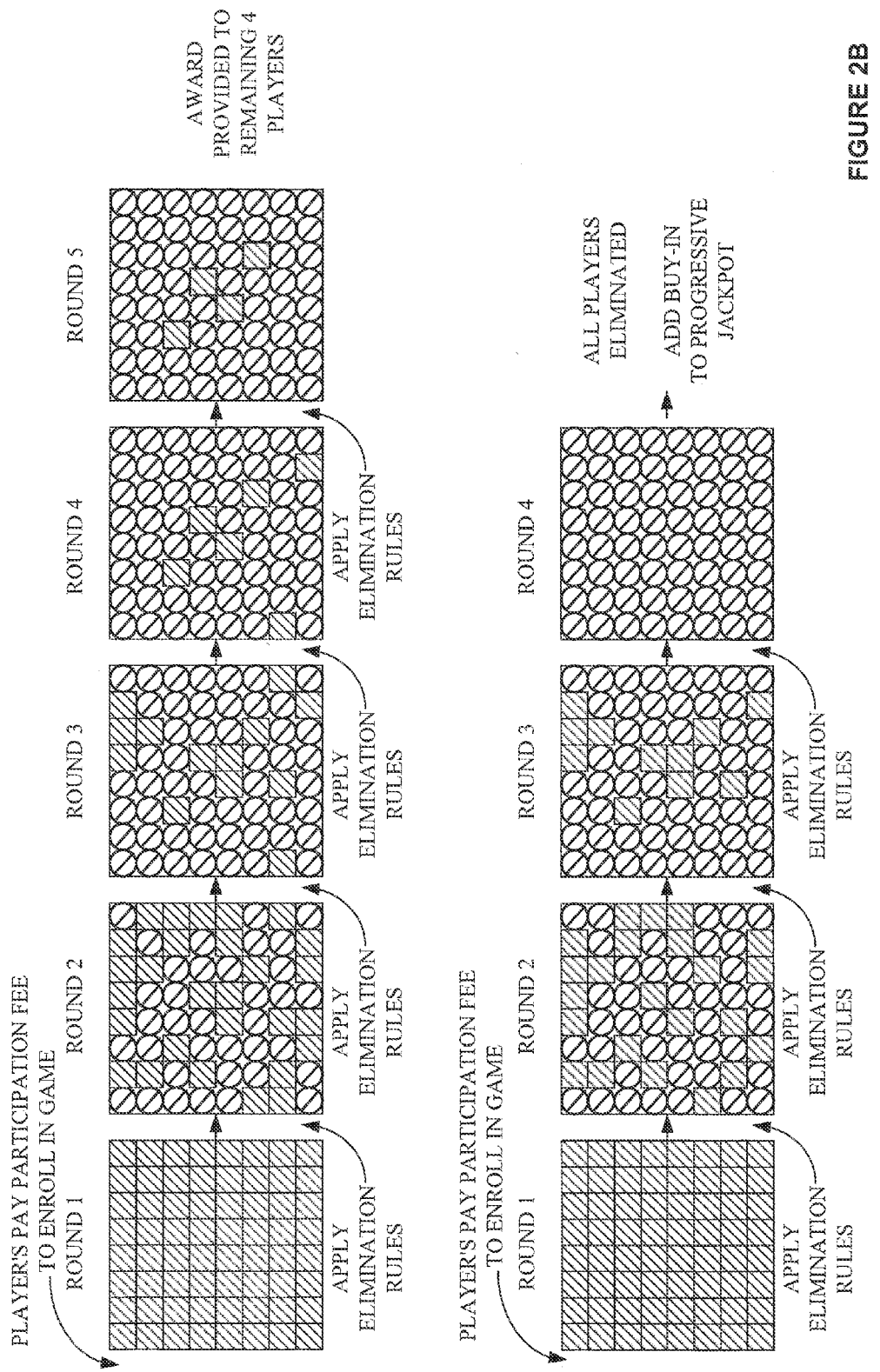
Figure 2C:
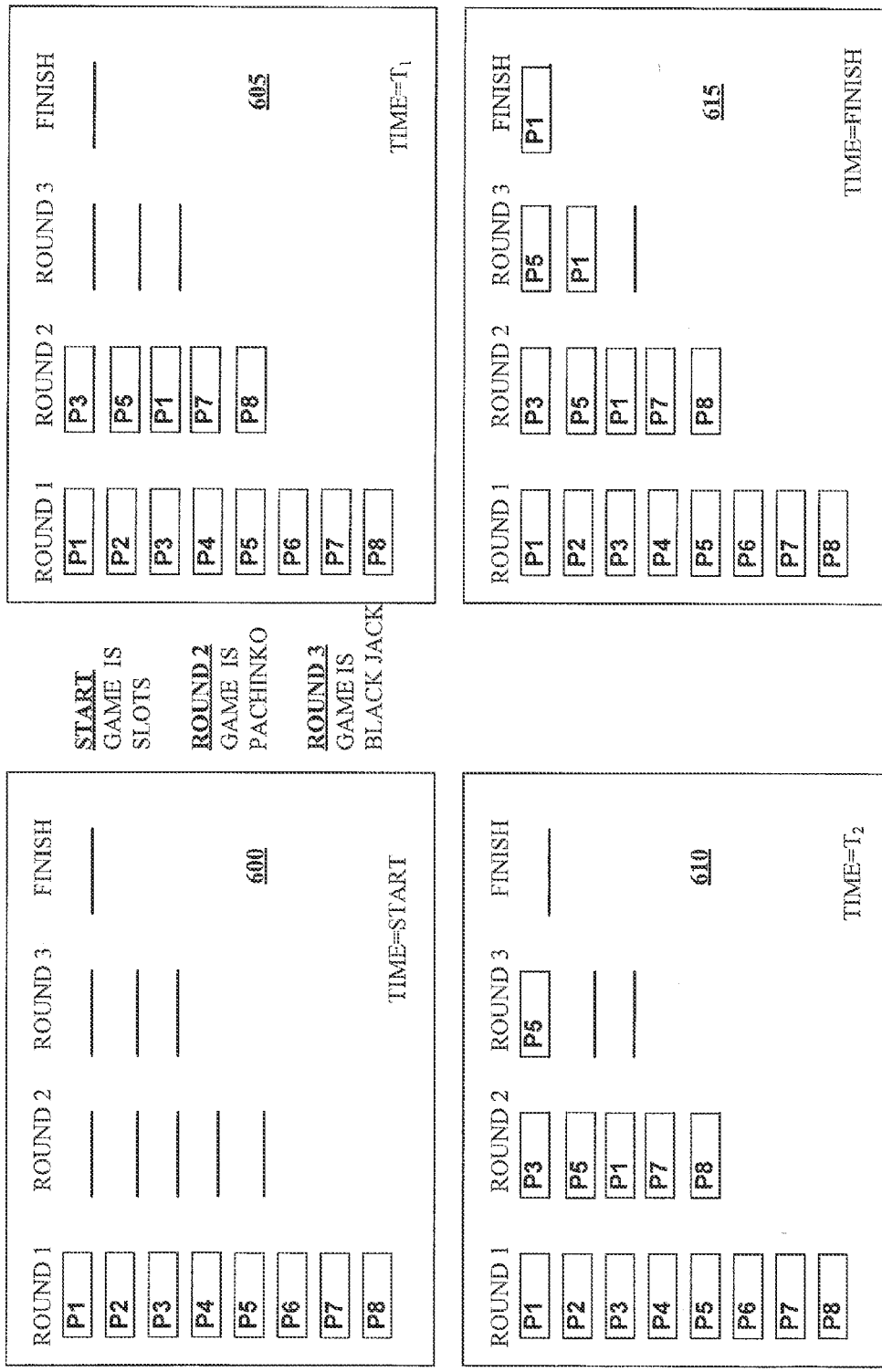
Figure 7:
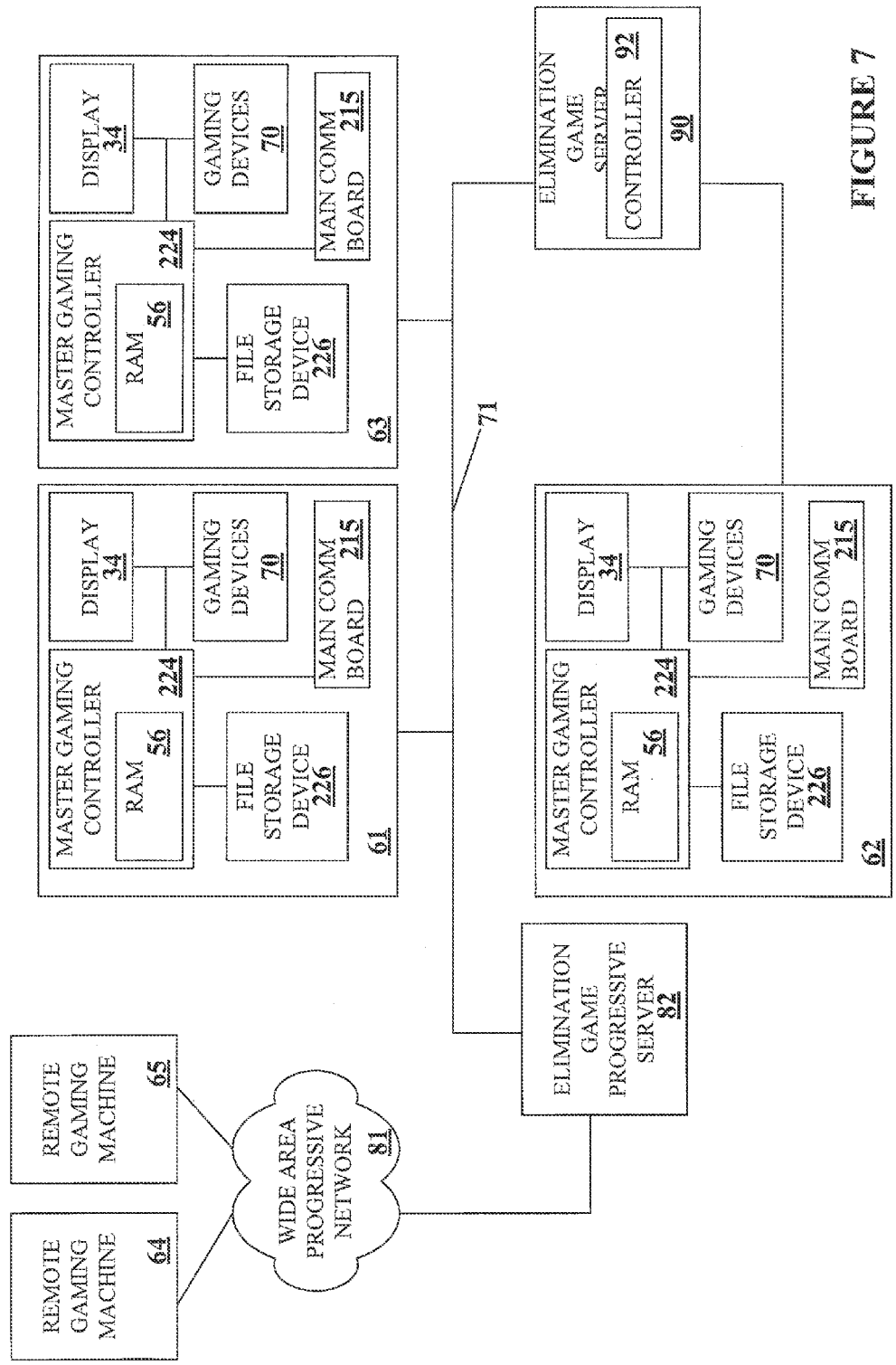
FIG. 7 is a block diagram of networked gaming machines and gaming devices that provide stand-alone elimination game play, linked elimination game play and progressive elimination games for one embodiment of the present disclosure.
Figure 8:
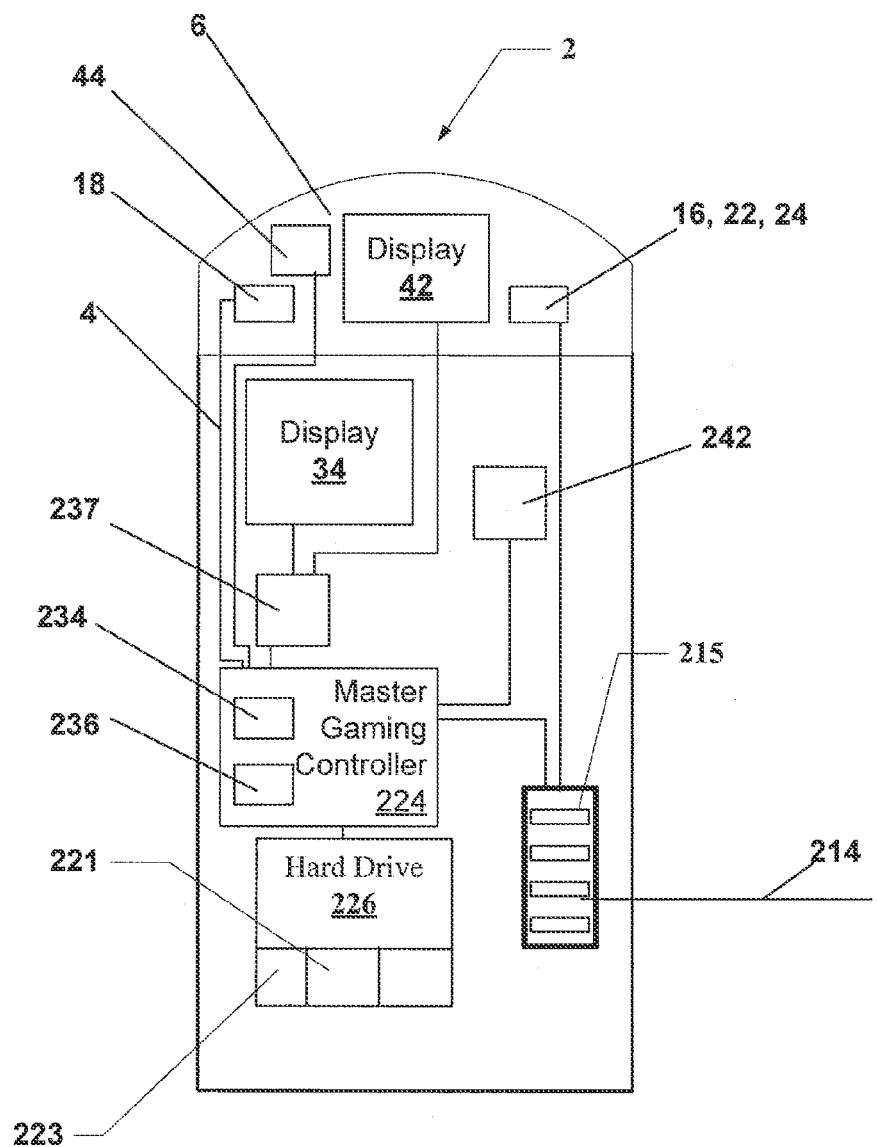
FIG. 8 is a block diagram of a gaming machine of the present disclosure.
Figure 9:
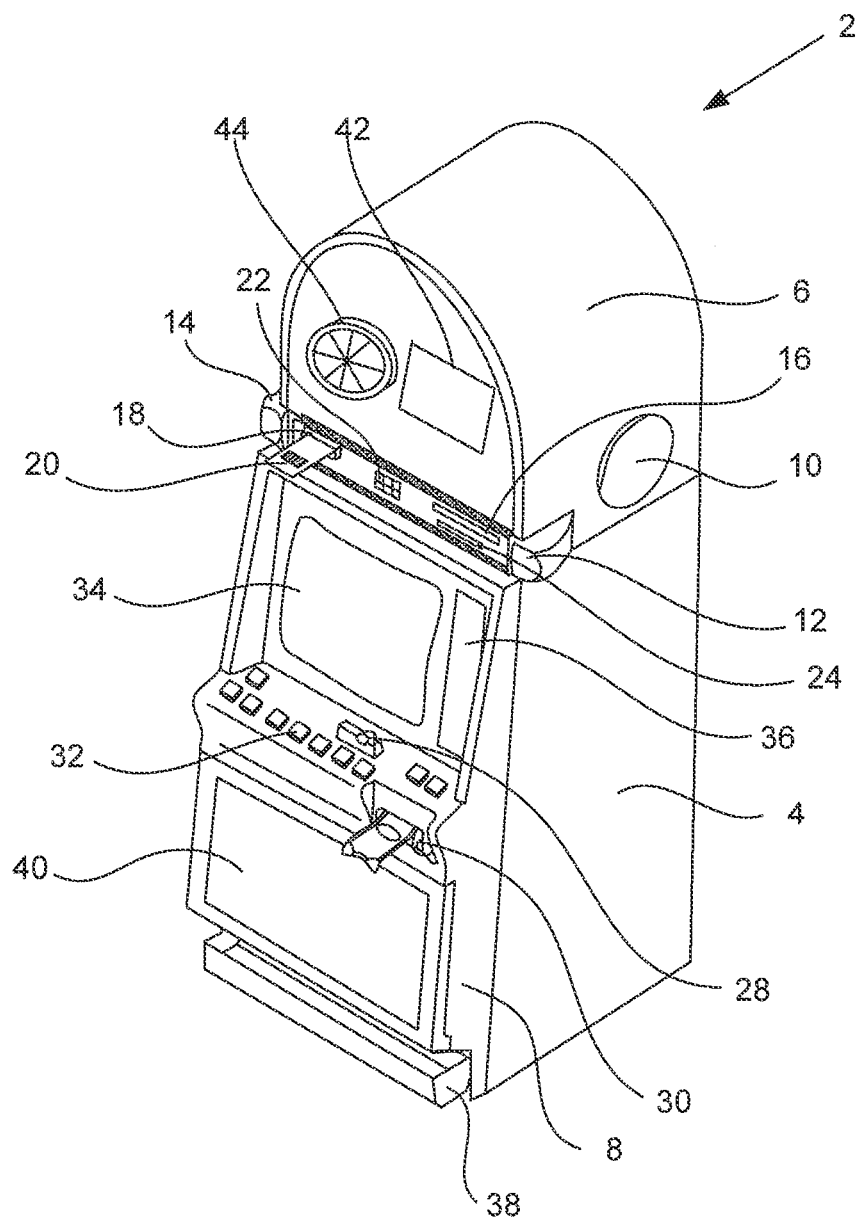
FIG. 9 is a perspective drawing of a gaming machine having a top box and other devices.

FIG. 1A is an example of time line for an elimination game with four entities. In this figure, some concepts relating to elimination game methods of the present disclosure are described. In FIG. 1B, a flow chart of an elimination game methodology is described. In FIG. 2A-2C, elimination probabilities and elimination test methods for elimination games are discussed. In FIGS. 3A-3D and 4A-4D, examples illustrating the play of an elimination game are described. In FIGS. 5A-5B, an example of a voting method that may be used in an elimination game is described. In FIG. 6, an example of team play in an elimination game is discussed. In FIGS. 7-9, examples of hardware that may be used to provide an elimination game are described. The present disclosure is not limited to the examples described with respect to these figures which are provided for illustrative purposes only.

Returning to FIG. 1A, in the timeline, the elimination game has a start and a finish. Prior to the start of elimination game, a plurality of entities may be enrolled in the elimination game. After the start of the elimination game, game play is provided to each entity enrolled in the elimination game. At a stage in the elimination game after, the start of the elimination game but prior to the finish of the elimination game, an elimination test is applied to at least one of the entities enrolled in the elimination game. When conditions described in the elimination test are met, the entity is removed from the elimination game.

When the entity is removed from the elimination game, the entity is prevented from participating in any game events that may occur between a stage in the elimination game when the entity was eliminated and the finish of the elimination game. For example, after the application of an elimination test, game events such as additional game play may be provided and additional elimination tests may be applied to entities remaining in the elimination game. Thus, unless the removed entity is allowed to re-enter the elimination game, which may occur in some embodiments of the present disclosure, the removed entity is not allowed to reach the finish of the elimination game.

A total number of entities that are removed in the elimination game and a stage in the elimination game where each entity is removed may vary from game. For each entity, a probability of elimination may be affected by their game play, the game play by the other entities in elimination game, a number of entities enrolled in the elimination game and the rules of the elimination game (see FIG. 2B for more details). For example, in the play of a first elimination game with a first set of rules, all of the entities enrolled at the start of the elimination game may be eliminated from the elimination game prior to reaching the finish of the elimination game. In the play of a second elimination game with the same set of rules as the first elimination game, all of the entities enrolled at the start of the elimination game may reach the finish of the elimination game. In the play of the second elimination game, an elimination test may have been applied to a number of the enrolled entities but conditions of the elimination test were not met. Thus, none of the entities were eliminated from the elimination game. In other embodiments, the rules of a particular elimination game may require that at least one entity enrolled in the elimination game is removed prior to the finish to the finish of the particular elimination game. For example, the elimination game may include an elimination test where a low scorer in a game provided during the elimination game round is eliminated.

In the present disclosure, the concept of an "elimination game round" is introduced. In the elimination game round, game play is provided and then an elimination test is applied to one or more the entities enrolled in the elimination game. After the elimination test is applied, entities that have satisfied the conditions of the elimination test are removed from the game and the elimination game round ends. Thus, a simple elimination game structure may comprise: i) a start, ii) one or more elimination game rounds, iii) an end game with one or more game events after the elimination game round and iv) the finish of the elimination game. In the time lime of FIG. 1A, two elimination game rounds are shown where game play and an elimination test are applied to one or more of the enrolled entities in each round, followed by an end game and the finish of the elimination game.

An entity enrolled in the elimination game may comprise one or more players. For example, an entity may comprise a plurality of players, which participate in the elimination game as a team. As another example, each entity participating in the elimination game may comprise a single player. The players in each entity may play one or more games that are provided during elimination game. For example, in one embodiment of the present disclosure, as part of the game play provided during the elimination game, one player may select another player to be removed from the elimination game. Thus, the game play by each player may involve voting for the elimination of one or more player (see FIGS. 5A and 5B for more details). In another example, each player in an entity may play a slot game. The objective of the one or more entities playing the provided slot game may be to exceed a performance metric, such as a point total, during their play of the slot game.

The players comprising each entity may be "virtual players", "real" players or combinations thereof. A real player is a human that has control over aspects of their game play and may make game decisions during the elimination game. For instance, a real player may engage in monetary transactions such as making a wager based on the outcome of the elimination game. Further, a real player may receive an award based upon the performance of an entity in the elimination game. As another example, when a card game, such as poker game, is provided as part of the elimination game, the real player may make decisions regarding holding and drawing cards. In yet another example, when a slot game is provided as part of the elimination game, the real player may initiate the slot games using an input device connected to a gaming machine.

Typically, a participation fee is required from the real players to participate in the elimination game. Among other embodiments, the participation fee may be a wager made on a game of chance such as a slot game that a real player is playing when the elimination game is started. As an another example, a real player may request to participate in an elimination game and make a wager made on an outcome of the elimination game. In another example, a player may request to participate in an elimination game against a number of other players where each player contributes a buy-in to the elimination game. For buy-in type games, the buy-in may be divided among the players participating in the elimination game.

Virtual players may be generated by a logic device, such as a master gaming controller, on a gaming machine. As another example, a server with a logic device connected to a number of gaming machines may generate virtual players. Details of hardware used to provide elimination games are described with respect to FIGS. 7-9. The logic device may simulate the play of a real player. For instance, when the game play provided in the elimination game is to play 10 slot games, the logic device may initiate 10 slot games and results of the 10 slot games for the virtual player may be displayed. As another example, when the game play provided in the elimination game is to vote for another player for removal from the elimination game, the logic device may randomly select another player for removal from the elimination game or the logic device may apply a set of heuristic rules to determine which player to remove. In some cases, real players may not be able to determine which players are virtual players and which players are real players.

At the finish of the elimination game, awards may be indicated for players that have completed the elimination game. Awards may be indicated to players at other stages in the elimination game. For instance, each time an elimination test is applied to a player and the conditions of the elimination are not met, an award amount may be indicated to the player. In one embodiment, the award amount may be immediately credited to the player as soon as it is indicated. In another embodiment, the players may accumulate awards but may not be credited with the award amount until a later stage in the game such as the finish of the elimination game. As is described with respect to FIGS. 3A-3D and 4A-4D, a scoreboard may be used to display each of the players status in the elimination game.

In another embodiment, during an elimination game, players may be able to make wagers and earn awards that are independent of the outcome of the elimination game. For example, the game provided in the elimination game may be a play of a slot game. Like the play of the slot game when it is not used in an elimination game, the players in the elimination game may be able to make wagers on the outcome of each slot game and receive awards for the outcome of the slot game. The wagers made on each slot game may be independent from the outcome of the elimination game and any participation fees that were made to play the elimination game.

Next, using the timeline in FIG. 1A, the play of elimination game with four entities is described. The description is provided for illustrative purposes only. Prior to the start of the elimination game, four entities each comprising a single player are enrolled in the elimination game. The first entity and fourth entity are real players. The second entity and the third entity are virtual players.

In the first round of the elimination game, a game is provided and an elimination test is applied. After application of the elimination test, the first entity is removed from the elimination game. The elimination test applied to the entities in an elimination game may be based upon one or more conditions included in the elimination test. Many elimination test conditions and combinations of combinations of elimination test conditions are possible and are not limited to the examples described herein.

The condition used in the elimination test may be dependent or independent on the game play provided in each elimination game round. For instance, in one embodiment of the present disclosure, a fixed probability of elimination between 0 and 1, such 0.25, may be used as an elimination test condition (see FIG. 2A-2C for more details). Then, for each entity that receives the elimination test, a random number between 0 and 1 may be generated and may be compared to the fixed elimination probability. When the random number is less than the elimination probability, the condition is met and the entity may be removed.

Thus, as example of using a fixed elimination probability in an elimination game round, using the time line in FIG. 1A with the four entities, the four entities may participate in the provided game play. Next, an elimination test with elimination test condition with a fixed elimination probability of 0.25 may be applied to each entity. To apply the elimination test condition, random numbers may be generated for each entity and compared to the 0.25 elimination probability. As an example, when random numbers of 0.2, 0.3, 0.4 and 0.8, are generated for entities 1-4 respectively, the first entity is removed in the first elimination round as shown in the FIG. 1A because the random number for entity 1 of 0.2 is less than 0.25. In this example, the elimination test condition is independent of the game play in the round.

One or more elimination test conditions may depend on the results of the provided game play in one or more of the elimination game rounds. For the provided game play, a game and one or performance metrics relating to game events and/or game results in the game may be defined where each entity participating in the game does not have a competitive advantage over any other entity in regards to achieving the one or more performance metrics. Then, an elimination test may be derived using the performance metrics. For example, the game used for the game play may be the play of a number of slot games where each entity plays the slot game an equal number of times. To give each entity an equal competitive advantage, the same pay table may be used for each slot game. A performance metric relating to the slot game may be the total number of credits won during the number of slot games. Using this performance metric, an elimination test condition for an elimination test may be that the entity with the lowest score at some stage in the elimination game is automatically eliminated. Thus, in FIG. 1A, entities 1-4 may have played an equal number of slot games, entity 1 may have achieved the lowest credit total which results in entity 1 being removed from the elimination game. As another example, entities 1-4 may play a video poker game a fixed number of hands and the performance metric may be the total number of credits won during the number of poker hands where the credits won in the first and last hand are doubled. The elimination test condition for the elimination test may be the entity with the lowest number of credits is removed from the elimination game i.e., the elimination probability for the entity with the lowest number of credits is 1. Thus, in FIG. 1A, entities 1-4 may have played an equal number of poker games, entity 1 may have achieved the lowest credit total which results in entity 1, being removed from the elimination game.

In the slot game and the card game described in the previous paragraph, one entity does not have a competitive advantage over any of the other entities. The present disclosure is not so limited. For example, for an additional fee, one player may be able to gain a competitive advantage over another entity in the elimination game. Thus, using the slot game described above, for an additional participation fee, entity 4 may play 11 slot games in the first elimination game round while entities 1-3 may play 10 slot games in the first elimination game round. Or using the slot game above, for an additional participation fee, entity 4 may play 9 paylines in the slot game while entities 1-3 may play only 8 paylines in the slot game. Thus, entity 4 has a competitive advantage over entities 1-3 in regards to achieving the highest credit total. But, even with the competitive advantage, entity 4 may achieve the lowest credit total in the elimination game round and still be eliminated. Typically, real players competing in an elimination game will not be allowed to have a competitive advantage over other real players. However, real players may be provided with opportunities to gain a competitive advantage over virtual players enrolled in the elimination game.

In another embodiment of the present disclosure, an elimination test condition may be based upon a milestone relating to a performance metric. For instance, in the slot game where the performance metric is a total credits won, the Elimination test condition may be that all entities with a total score below the milestone are eliminated. In another example, a series of milestones may be provided where each milestone that is achieved during game play decreases an entity's chances of elimination via the application of an elimination test.

In embodiments of the present disclosure, the elimination test conditions may be modified to provide an entity with immunity from elimination. For instance, an entity in the elimination game may receive immunity from the elimination test in the first elimination round based upon their play during the elimination game. A few examples in which each of the four entities may earn immunity are described as follows. When the game provided in the first game is a slot game, a symbol appearing in the slot game or a combination of symbols appearing the slot game may allow one of the entities to earn immunity in the elimination test (e.g., a zero probability of elimination). As another example, a top performer in the game provided, as defined by a performance metric of some type relating to the game provided in the elimination game round, may receive immunity from an elimination test in that round or a subsequent round. For instance, when the game play provided during an elimination game round involves voting for the removal of other entities, the entity with the best performance during the game in one elimination round may be immune from elimination via voting in the next elimination game round. Additional details of voting in elimination games are described with respect to FIGS. 5A-5B.

The elimination test conditions may be based upon the results of the game play provided in each round and the probability of elimination for each entity may be increased or decreased. For each entity, the elimination probability may be increased or decreased according to: 1) an individual performance of the entity in the game provided during the elimination round, the relative performance of the entity as compared to other entities and combinations thereof. For instance, each entity may start with an equal elimination probability. Then, during the play of a slot game, a certain symbol or combinations of symbols appearing on a pay line may increase or decrease an individual elimination probability. Therefore, entities 1-4 could each start out the elimination game with an individual elimination probability of 0.25. However, after the play of the game in the elimination round, the elimination probability may be 0.8 for entity 1, 0.3 for entity 2, 0.20 for entity 3, and 0.05 for entity 4. The elimination probability for entity 1 may have been increased because of game events that occurred during the play of the game, because entity 1 performed poorly in the play of the game relative to the other entities and combinations thereof.

In round 2 of the elimination game in FIG. 1A, entities 2, 3 and 4 participate in the game play and entity 2 is removed from the elimination game. Entity 1 has been removed from the elimination game. However, as described above, in some embodiments of the elimination game an entity may be allowed to re-enter the elimination game. For elimination games with multiple elimination game rounds, the game play, the performance metrics and the elimination test conditions may vary from round to round (see FIGS. 3A-3D for more details). For example, the game play provided to each entity in round 1 may be a slot game while the game play provided in round 2 may be a pachinko game. The performance metric for round 1 may be a total score while the performance metric for round 2 may be a number of votes. Further, the elimination test condition for the first round may be the entity with the lowest total score in a game relative to the other entities is eliminated while in the second round the entity with the most votes after a vote by the other entities may be eliminated.

In FIG. 1A, after round 2, additional game play is provided in the end game and an award is indicated after the finish of the elimination game. Entities 3 and 4 participate in the end game and reach the finish of the elimination game. The end game may be used for a number of purposes such as allocating awards or earning rounds.

In one embodiment, awards may be allocated according to relative performance of each entity in the game provided in the end game. For example, when the total score by entity 3 in the play of the game in the end game is greater than the total score of entity 4, entity 3 may receive an award and entity 4 may not receive an award. As another example, when the total score by entity 3 in the play of the game in the end game is greater than the total score of entity 4, entity 3 may receive an 75% of an available award and entity 4 may not receive 25% of an available award. In one embodiment, the award amount at the finish of the elimination game may be based upon the odds of the entity reaching the finish of the elimination game (see FIG. 2A). In another embodiment, the award amount may be a fraction of the participation fees received at the beginning of the elimination game.

In another embodiment of the present disclosure, the game provided in the end game may be used as a prize round. Thus, each entity that reaches the end game is allowed to keep all of the prizes, which may be cash or may be merchandise, that are earned in the play of the game provide during the end game. The amount of awarded prizes for each entity is indicated at the finish of the game. However, as will be described with respect to FIG. 2, awards may be indicated at any stage of the game. In one embodiment of the present disclosure, an entity may be to accumulate various awards during the play of the elimination game. But, the entity is only allowed to keep the prizes when the finish of the elimination game is reached by the entity.

FIG. 1B is a flow chart depicting an elimination game playing methodology on a gaming machine for one embodiment of the present disclosure. In 500, the gaming machine receives a request from an entity to participate in the elimination game. In one embodiment of the present disclosure, the gaming machine may be used in a stand-alone mode where it is not connected to other gaming machine. In this embodiment, the entity requesting the elimination game may be from a player using input devices on the gaming machine. In another embodiment of the present disclosure, a gaming machine may be used with an elimination game server that provides an elimination game to a plurality of gaming machines. Further details of an elimination game server are described with respect to FIG. 8.

When an elimination game server is used, the request for the elimination game may be received by the gaming machine and sent to the elimination game server. Again, the entity requesting the elimination game may be from a player using input devices on the gaming machine. The elimination game server may also be a gaming machine. Details of using a gaming machine as a game server are described in co-pending U.S. application Ser. No. 09/595,798, filed on Jun. 16, 2000, by Brosnan et al. and titled "Using a Gaming Machine as a Server," which is incorporated herein by reference in its entirety and for all purposes.

In 510, the gaming machine may receive elimination game modifiers. The elimination game modifies may be displayed as a menu on a display screen on the gaming machine. Thus, the player may be able to select these elimination game modifiers using a touch screen, input buttons, or another input device connected to the gaming machine. Examples of elimination game modifiers that may be selected by the player include but are not limited: 1) one or more games to be used for game play in the elimination game and details regarding the games, 2) a number of elimination game rounds in the elimination game, 3) a paytable for the elimination game, 4) a number of entities in the elimination game (e.g., virtual players may be added to enable the number of entities), 5) tournament play versus team play, 6) performance metrics to be used in elimination tests and 7) elimination test conditions, 8) different sets of rules for the elimination game and 9) a number of entities controlled in the elimination game by the player (see FIGS. 3A-3D).

In 515, the gaming machine may receive a participation fee. The participation fee allows a player to participate in the elimination game. The participation fee may be a wager on the outcome of the elimination game. Further, in the case of an elimination tournament against a number of other real players, the participation fee may be a buy-in for the tournament where the buy-ins from a plurality of real players forms a pool of money that may be divided among the participants in the elimination game. In one embodiment, the participation fee may be a wager on a game of chance where the elimination game is a bonus game for the game of chance.

In some embodiments, elimination game modifiers selected in 510 may affect the participation fee for the elimination game. For example, elimination game modifiers that provide an entity with a competitive advantage over one or more of the other entities in the elimination game may be selected by a player. Thus, the selection of certain elimination game modifiers may increase the participation fee. In another example, a player may desire play a plurality of entities during the elimination game, which may increase the participation fee. In yet another example, the player may be able to select elimination test conditions which increase or decrease the player's probability of winning the elimination. The participation fee may be higher for elimination test conditions that increase the player's chances of winning. Further, the player may be achieve a lower participation fee by selecting elimination game modifiers that place them at a competitive disadvantage relative to the other entities enrolled in the elimination game.

Besides affecting the participation fee, the elimination game modifiers selected by the player may affect award amounts in the elimination game. For example, the player may make the elimination game harder by increasing the number of elimination game rounds or increasing the elimination probability in each round. These selections may decrease the player's odds of progressing in the elimination game and reaching the finish of the elimination game. The player may make a wager (another example of a participation fee) on their progress in the elimination game. Thus, when the player selects game modifiers that make reaching a stage in the elimination less likely, the award amounts for reaching different stages in the elimination game such as the finish of the elimination game may be increased.

In 520, the gaming machine may generate the elimination game based upon the received elimination game modifiers. For example, an elimination game with a number of rounds, types of games and a number of entities specified by The player may be generated. When an elimination game server is used, the elimination game server may generate the elimination game based upon game modifiers received from the plurality of gaming machines.

In one embodiment of the present disclosure, the elimination game may be generated as a bonus game for a game of chance on a stand-alone gaming machine. An elimination bonus game may be triggered by a game event that occurs during the play of the game of chance on the gaming machine. For instance, in a slot game, a combination of symbols on the reels may trigger the bonus elimination game. In this example, the participation fee may be the wager used to participate in the slot game and the player may not have to provide an additional participation fee to play the bonus elimination game. After the elimination bonus game is triggered on the gaming machine, the gaming machine may generate the bonus elimination game using default elimination game modifiers where the player does not have the opportunity to modify the bonus game elimination game. In another embodiment, the player may enter elimination game modifiers as described in 510.

In another embodiment of the present disclosure, the bonus elimination game may be generated simultaneously on a plurality of gaming machine connected to an elimination game server. The elimination bonus game may be triggered by a single game event one gaming machine, a combination of game of events on one gaming machine or a combination of game events on the plurality of gaming machines.

Prior to the triggering of the elimination bonus game, the plurality of gaming machines connected to the elimination game server may be used to play the same or different games of chance. For instance, when the elimination bonus game is triggered, each of the plurality of slot machines may be configured to play the same slot game. In another example, when the elimination bonus game is triggered, a slot game may be in progress on a first gaming machine, a video poker game may be in progress on a second gaming machine and other combinations of slot games, card games and games of chances may be in progress on the remaining gaming machines in the plurality of gaming machines.

When the elimination bonus game is triggered, the participation fee for the elimination bonus game may be the wager for the game of chance being played on each gaming machine. Thus, the elimination bonus game may only be provided on the gaming machines in the plurality of gaming machine connected to the elimination game server that are actively being played where the bonus elimination game is generated using the number of active gaming machines. The players on the active gaming machines may be able to modify the elimination bonus game as described in 510 or the elimination game may be generated using predetermined parameters. For example, a pre-determined parameter for generating the elimination game may be to use a fixed number of players. In this embodiment, the elimination game server may enroll the number of players that are actively playing gaming machines when the bonus game is triggered and then may generate a number of virtual players to reach the fixed number of players. As another example, pre-determined parameters may be a number of rounds to use in the elimination game. The number of rounds may not be fixed and may vary according to the number of real players in enrolled in the elimination game. For instance, the number of rounds used in the elimination game may be increased as the number of real players enrolled in the elimination game is increased.

In 525 and 530, elimination game play is provided on one or more gaming machines and an elimination test is applied to a number of the plurality of entities enrolled in the elimination game. As described with respect to FIG. 1A, the structure of the elimination game may include a number of elimination game rounds where game play is provided and an elimination test is applied. Thus, the game play and the elimination test in 525 and 530 may comprise an elimination game round and 525 and 530 may be repeated for a number of elimination game rounds.

In 525, the game play for the elimination game may be a traditional game of chance played on a gaming machine (e.g., a slot game or a video poker game) or another type of game, such as a game involving selecting the removal of other players (e.g., voting). For an elimination game on a standalone gaming machine, the game is displayed on the gaming machine and a player may use input mechanisms on the gaming machine to play the game. For an elimination game played on a group of gaming machines connected to an elimination game server, the game play is displayed on each gaming machine and a player may use input mechanisms to play the game.

In one embodiment of the group elimination game, the game provided on each of the gaming machine may be separate from the games played on the other gaming machines. For instance, a slot game may be provided on each gaming machine where the games are played independently of one another. In another embodiment, the players on the each of the gaming machines may participate in a single game where the input from all of the players affects the game play in the single game and the single game is displayed on the display screens of all of the gaming machines. The single game may be generated by the elimination game server where the elimination game server receives inputs from each of the gaming machines where players are participating in the game and combines the results into the single game. For example, in FIG. 6, a dodge ball game is shown where the players in the game try to eliminate one another by throwing balls at each other. In this example, all of the players participating in the game may be displayed on the display screen of each gaming machine where a player is participating in the dodge ball game. Thus, each player may be able to view the progress of the entire game and their status in the game on the display screen of the gaming machine where they are playing the game.

In yet another embodiment, when a plurality of gaming machines are connected to the elimination game server, the plurality of gaming machines may be divided into subgroups where the games provided on each of the subgroups of gaming machines are independent but the games provided within each of the subgroups may depend on one another. For example, the plurality of players enrolled in the elimination game may be randomly grouped in pairs. In each elimination game round, the pair of players may compete head-to-head against each other in a game where the play of the game depends on inputs from both players. After the game, one player may be eliminated from each pair. In the next round, the remaining players may be randomly paired again. This grouping strategy is not limited to two players and could be extended to groups of two or more. In another example, the players could be randomly assigned to groups of two or more and play the game together as a team. In one embodiment of the present disclosure, the players may be able to choose to play together as a team in the elimination game.

In 526, after game play is provided, a status in regard to whether the game play was part of an end game may be checked. When the game play is part of an end game, then the elimination test may not be applied in 530 and the finish of the elimination game may be reached. When the finish of the elimination game is reached, awards for each entity may be indicated. When the provided game play is not part of an elimination game round, then the elimination test in 530 may be applied.

As described with respect to FIG. 1A, the end game may comprise one or more game events, such as additional game play, between after the last elimination game round and the finish of the elimination game. In elimination games with a single elimination game round, if the elimination game ended directly after the application of the elimination test, then all of the entities would essentially reach a finish the elimination game without the possibility of removal from the elimination game prior to the finish of the elimination game. Thus, in the elimination game with the single elimination game round, the end game insures that at least one entity may be removed from the elimination game prior to reaching the finish of the elimination game.

In an elimination game with multiple rounds, a first entity may face the possibility of removal from the elimination game after the first elimination game round. When the first entity is removed, it may not participate in game events provided in subsequent elimination game rounds, which occur between after the end of the first elimination game round and the finish of the elimination game. Thus, for elimination games with multiple rounds, the end game may or may not be include in the elimination game structure and the elimination game may end after the application of an elimination test in a last elimination game round.

In 530, the elimination test is applied to one or more entities in the elimination game. Each entity may comprise one or more players. In one embodiment of the present disclosure, the number of players in each entity may not be equal. For instance, a first entity in the elimination game may comprise one player whereas a second entity may comprise two players and a third entity may comprise five players. Further, as described with respect to FIG. 1B, all or a portion of the players in each entity may be virtual players generated by a logic device.

When an entity in the elimination game comprises a plurality of players, the elimination test may be applied to the entire entity or elimination test may be applied individually to each player in the entity. For instance, a first entity with a plurality of players may compete against a second entity with a plurality of players in a head-to-head competition where one of the entities is removed after the elimination test is applied. Therefore, when the first entity or the second entity is eliminated, all of the player's in the eliminated entity are removed from the elimination game. In another example, the player's in each entity may be eliminated and removed from the elimination game individually. For instance, in a dodge ball game with two teams each comprising a number of players, the player's on each team may be picked-off individually and removed from a game until all the player's on one team are removed from the game. Thus, in some embodiments of the present disclosure, the number of players in each entity may change during the course of the elimination game. In other embodiments of the present disclosure, the number of players in each entity may remain fixed.

In some embodiments of the present disclosure, the elimination test may not be applied to all of the entities enrolled in the elimination game in each elimination game round. For example, as described with respect to FIG. 1A, the elimination game may include game events that allow a player or an entity to earn immunity from one or more elimination tests. When the entity or a player in an entity has immunity, the elimination test may be applied to the player or the entity but the probability of the conditions of the elimination test being met may be zero. During elimination games with immunity, an elimination test is applied to at least one of the entities enrolled in the elimination game and when the conditions of the elimination test are met the entity is removed from the elimination game prior to the finish of the elimination game.

In 535, after the elimination test is applied to an entity or a player, the conditions of the elimination test are checked. In 550, when the conditions for the elimination test are met for the player or for the entity, the entity or the player is notified and removed from the elimination game. In some embodiments of the present disclosure, it may be possible to remove all of the entities with real players enrolled in the elimination game. When all of the entities with real players are removed from the elimination game, then the elimination game is typically ended. Thus, after each entity or player is removed from the elimination game, the number of real players remaining in the game may be checked to determine whether the elimination game is to continue.

In 552, the eliminated player or the eliminated entity may be allowed to re-enter the elimination game. When the eliminated player or the eliminated entity is allowed to reenter the elimination game, an additional participation fee may be required. In 554, when the required additional participation fee is collected, the eliminated entity or the eliminated player is allowed to reenter the elimination game and may be provided additional game play in 525. In some embodiments, the player or entity may not wish to pay an additional participation fee to reenter the elimination game. When the player or entity does not wish to pay an additional participation, then the elimination game ends for the removed player or entity. When re-entry is not allowed, the elimination game ends for the entity or the player removed from the elimination game in 535.

In 540, when conditions of the elimination test are not met for the player or the entity, a number of rounds remaining in the game may be checked. In 540, when there are no rounds remaining in the elimination game and the finish of the elimination game is reached, then awards may be indicated for each entity. In 555, at the finish of the elimination game for games with a progressive jackpot, it may be determined whether a progressive jackpot has been won. In 560, when the progressive jackpot has been won, the progressive award is indicated to the entity and in 565 an attendant may be called. Since the entity winning the progressive jackpot may comprise a plurality of players, the progressive award may be indicated on a plurality of gaming machines where the players in the entity may split the progressive award.

In 570, at the finish of the elimination game, awards may be indicated for one or more entities that have reach the finish of the elimination game. All of the entities that reach the finish of the elimination game may not receive an award. Thus, the award amount indicated may be zero. Since the entity reaching the finish of the elimination game may comprise a plurality of players, the indicated award for entities with multiple players may be displayed on a plurality of gaming machines. For an award for an entity with multiple players, the award may be distributed to the players in some manner. The award may be evenly distributed among the players in the entity or another distribution formula may be used. For example, the distribution of the award may be based upon each player's performance in game play provided during the elimination game.

As described with respect to 530, the elimination test may be applied individually to each player in a multiple player entity and the number of players in each entity may vary in the elimination game. Therefore, the multiple player entity may reach the finish of the elimination game with fewer players in the multiple player entity than when the elimination game was started. In one embodiment of the present disclosure, when an award amount is indicated for reaching the finish of the elimination game to the multiple player entity, only the players remaining in the multiple player entity receive a distribution from the indicated award amount and the players that were removed from the multiple player entity prior to the finish of the elimination game do not receive a distribution of the indicated award amount. In other embodiment of the present disclosure, when an award amount is indicated for reaching the finish of the elimination game to the multiple player entity, the players that were removed from the multiple player entity prior to the finish of the elimination game may receive a distribution of the indicated award amount.

As described with respect to FIG. 1A, awards may be indicated for various game events that occur in the elimination game. For example, during the game play in 524, a player or an entity may earn different awards. As another example, the player or the entity may earn an award for surviving an elimination test in 530. The award amounts for the player or the entity may also be cumulative. For example, the awards amounts may progress in a series of increasing amount according to the completion of each elimination game round in a multi-round elimination game.

The awards for the elimination game may be cash or non-cash prizes. For example, a player may win a non-cash prize such as a car for reaching the finish of the elimination game as part of a progressive jackpot. In addition, a player may be offered a combination of cash and non-cash prizes as awards for different outcomes of the elimination game. In one embodiment, a player may be able to select different combinations of cash and non-cash prizes as awards in the elimination game. Details of methods for providing non-cash prizes in a gaming environment are described in co-pending U.S. application Ser. No. 09/515,717, filed on Feb. 29, 2000, by Nguyen, and entitled, "Name Your Prize Gaming Methodology," which is incorporated herein by reference in its entirety and for all purposes.

In 545, an entity may be provided with an opportunity to bank all or a portion of an award amount earned up to the current stage in the game rather than continue with the elimination game. For example, when the award amount increase in a series according to reaching a particular elimination game round in a multi-round elimination game, at the end of an elimination game round, the player may be offered the opportunity to receive (e.g., bank) all or a portion of the earned award amount or risk all or portion of the earned award amount by attempting to reach the next elimination game round. The incentive for the continued play will typically be a larger award amount for completing the next elimination game round.

When the player or the entity decides to bank their winning, the player or the entity is removed from the elimination game and credited with the award that they chose to bank. When other players or other entities remain in the elimination game, the elimination game may continue without the removed entity or the removed player. When the player or the entity chooses not to bank their winnings, the player or the entity may continue to the next stage in the elimination game such as the beginning of the next elimination game round. For entities with multiple entities, the decision to either bank their winnings or to continue in the game made be decided by a vote of the players in the entity. In 545, the opportunity to bank the winnings is offered at the end of an elimination game round. However, the opportunity to bank the winnings may occur at other stages in the elimination, such as during the game play in 525, and is not limited to # the end of an elimination game round.

FIGS. 2A-2C are depictions of embodiments of elimination games of the present disclosure. In FIG. 2A, elimination probabilities in a multi-round elimination game are described. In the present disclosure, the elimination game may comprise from 1 to N elimination game rounds where N is some finite number. In the figure, rounds 1 to N are denoted as R1, R2, R3 . . . up to RN−1, and RN. In this example, for the purposes of explanation only, an average elimination probability for an elimination test in each elimination game round may be denoted as, $P_{ELIM}(RM)$ where M is greater than or equal to 1. $P_{ELIM}(RM)$ may be assigned a value, $X_R$, greater than or equal to 0 and less than or equal to 1.

The value of $X_R$ is not necessarily fixed and may depend on a number of elimination game parameters. For instance, $X_R$ may depend on but is not limited to: 1) a number of entities or players enrolled in the elimination game, 2) a number of rounds in the elimination game, 3) a participation fee (e.g., a wager) received for the elimination game, 4) one or more games provided during the elimination game and 5) one or more elimination test conditions selected for the elimination game. Further, $X_R$ may vary between rounds. For instance, the probability of elimination, $P_{ELIM}$ may increase in successive rounds. Therefore, the probability of elimination in RN may be greater than the probability of elimination in RN−1 and the probability of RN−1 may be greater than the probability of elimination in RN−2, etc. In addition, as described with respect to FIGS. 1A-1B, the probability of elimination may vary from entity or from player to player in the elimination game.

In some embodiments of the present disclosure, the elimination game may be structured in a manner that allows a pay table to be generated for the elimination game. In elimination games with a pay table, a player may make wagers according an outcome of the elimination such as reaching a stage in the elimination game and receive a payout according to the probability of reaching the stage in the elimination game. As an example, in one embodiment of the present disclosure, a fixed elimination probability may be used in an elimination test that is applied at the end of each elimination game round where the fixed elimination probability may vary from round to round. As described with respect to FIG. 1A, the elimination test may be applied by generating a random number and comparing it with the fixed elimination probability.

When the fixed elimination probability is independent of the fixed elimination probability in each of the other rounds and the elimination test is applied to each entity after each elimination game round, the probability of the entity reaching the end of a elimination game with N rounds may be described as, $$P_{SURVIVE}(RN) = \{1-P_{ELIM}(R1)\}\{1-P_{ELIM}(R2)\} \ldots \{1-P_{ELIM}(RN-1)\}\{1-P_{ELIM}(RN)\}, \text{where } 1 \# N$$

The present disclosure is not limited elimination games where the probability of elimination in a first elimination game round is independent of events in other elimination game rounds. As described with respect to FIGS. 1A and 1B, game events occurring in one elimination game round may affect the elimination probability in other elimination game rounds. For example, during the game play in one elimination game round an entity may earn immunity from elimination in a subsequent elimination game round. Also, the present disclosure is not limited to fixed elimination probabilities. The elimination probability may vary in an elimination game round according to game events that occur during game play in the elimination game round. Further, the elimination probability may vary from entity to entity in the elimination game and may change for each entity over the course of the elimination game.

In FIG. 2A, an elimination game with six rounds is described where half of the entities are removed at the end of each round. Therefore, $P_{ELIM}$ in each round equals ½. For example, a slot game may be played by each entity in each elimination game round. At the end of each elimination game round, the top half of scorers in the slot game may be allowed to remain in the elimination game while the bottom half of scorers is removed from the elimination game. As another example, at end of each elimination game round, an elimination test, like a coin toss, may be applied to each entity where the entity has a 50% of advancing to the next elimination game round.

An area highlighted in the square as compared to a total area of the square graphically represents a probability of each entity remaining in the elimination after the application of the elimination test in each elimination game round. In the Using the odds of surviving consecutive elimination tests given above and shown in FIG. 2A, a pay table may be generated with an award amount for a consecutive number of elimination game rounds completed by the player. To allow for a house advantage the award amounts may be less than the corresponding odds. An example of pay table is listed below,

| ELIMINATION GAME ROUND COMPLETED | AWARD AMOUNT FOR 1 CREDIT WAGER INCLUDING ORIGINAL WAGER |
|---|---|
| 1 | 1.75 |
| 2 | 3.5 |
| 3 | 7 |
| 4 | 14 |
| 5 | 29 |
| 6 | 60 |

The paytable listed above may be displayed on a gaming machine.

In one embodiment of the present disclosure, a player may make a wager on a multi-round elimination game on a gaming machine, such as the six round elimination game described above. A table of the possible outcomes of the elimination game may be stored on the gaming machine with corresponding odds of obtaining a particular outcome in the elimination game, such as reaching round 6. When the player initiates the elimination game on the gaming machine, the outcome of the elimination game may be determined by the master gaming controller on the gaming machine. For instance, the gaming machine may determine the player is eliminated in the first round. As another example, the gaming machine may determine the player is eliminated in $6^{th}$ round or the gaming the gaming machine may determine that the player completes the elimination.

After the gaming machine determines the outcome of the elimination game, the gaming machine may generate a game outcome presentation that corresponds to the generated outcome. For example, when the gaming machine determines the player reaches the finish of the elimination game, the gaming machine may generate a game outcome presentation where the player appears to advance through each elimination game round avoiding elimination until the player reaches the finish of the elimination game with the indicated award. When the gaming machine determines the player is eliminated in a particular round, the gaming machine may generate a game outcome presentation where the player appears to advance to a particular round prior to being eliminated.

In another embodiment of the present disclosure, the gaming machine determine the outcome of the elimination game as the elimination game is played. For example, in the six round elimination game described above, the player may begin the elimination game with the game play provided in the first elimination game round. After the game play in the first elimination round, the gaming machine may apply an elimination test and then notify the player of the outcome of the elimination test as is described with respect to FIG. 1B. When the player is not eliminated, the game play may proceed and additional elimination tests may be applied until the player is eliminated or the player reaches the finish of the elimination game. Using the pay table described above, the award amount for the player may be based upon how many rounds in the elimination game they complete prior to elimination from the elimination game or reaching the finish of the elimination game.

In FIG. 2B, an example of elimination game with a tournament format is described. In the figure, an elimination game with four elimination game rounds is played by a plurality of entities where each entity comprises a single player. The players in the elimination game may be either virtual players or real players. The four round elimination game is played twice.

At the start of the elimination game sixty four players are enrolled in the elimination game. The real players in the elimination game pay a participation fee to enroll in the elimination game. In one embodiment, the participation fee may be a buy-in to participate in the elimination game tournament. In another embodiment of the present disclosure, the elimination game may be implemented as a bonus elimination game on a group of gaming machines where player's that are actively playing the gaming machines when the bonus elimination game is initiated are automatically enrolled in the bonus elimination game.

In the first play of the four round elimination game, an elimination test is applied to each player. In the first elimination game round, 36 players are eliminated. In the second round, 15 players are eliminated. In the third round, 7 players are eliminated. In the fourth round, 2 players are eliminated and 4 players reach the finish of the elimination game. An award is indicated for each of the 4 players that reach the finish of the elimination game. When one or more of the 4 players that reach the finish of the eliminate game is a virtual player, the award for the one or more virtual players may be contributed to a progressive jackpot, may be divided among the real players that finish the elimination game or may be kept by the house (e.g., a gaming entity that operates the gaming machine on which the elimination game is played).

In the second play of the elimination game, the real players in the elimination game again pay a participation fee to enroll in the elimination game. 64 players start the elimination game. The numbers of real and virtual players enrolled in the elimination game may change from game to game. In one embodiment of the present disclosure, the total number of players in the elimination game may be held constant (e.g., 64 in this example). When there less than 64 real players enrolled in the elimination game, virtual players are generated to fill any remaining slots up to the designated number of players.

In first round of the elimination game, 41 players are eliminated. In the second round, 12 players are eliminated. In the third round all of the remaining 11 players are eliminated prior to the finish of the elimination game. In one embodiment, all or a portion of the participation fees collected at the start of the elimination game may be contributed to a progressive jackpot which may be awarded in a subsequent play of the elimination game. Also, all or a portion of the participation fees may be kept by the "house" e.g., the gaming entity providing the elimination the game.

In FIG. 2C, an elimination game is described where entities compete to fill slots allocated for each elimination game round and race against one another to reach the elimination game. The second round, third round and finish of the elimination include 5 slots, 3 and 1 slot respectively. The elimination game starts with eight entities. The entities may comprise a single player or teams of players. Further, the players may be real players or virtual players. The real players may pay a participation fee to enroll in the elimination game.

In one embodiment of the present disclosure, the entities may compete to fill the available slots in a given round. When an entity obtains a slot, the entity waits for the remaining slots in the round to be filled before advancing to the next round. When all of the available slots in a round are filled, the entities that have not obtained a spot are removed from the elimination game. In another embodiment of the present disclosure, when an entity obtains an available slot in one elimination game round, the entity may begin to compete for a slot in a subsequent elimination game round before all of the slots in the current round are filled.

Therefore, in general, two advancement strategies are as follows. The advancement strategies may be used with the different elimination games described in the present disclosure. In the first advancement strategy, entities remaining in the elimination game may advance from one elimination game round to the next elimination round at the same time, i.e., in a synchronous manner. In the other advancement strategy, all of the entities competing in the elimination game may advance from one elimination game round to the next elimination game round at different times i.e. in an asynchronous manner. In the present disclosure, both advancement strategies may be employed in the same elimination game.

As an example, the elimination game in FIG. 2C is provided to illustrate the two advancement strategies. The elimination game is described at four times, a start, a finish and two intermediate times, $T_1$ and $T_2$. In round 1 of the elimination game, the eight players, P1 through P8, compete to reach a milestone in a slot game. The first five players to reach the milestone in the slot advance to round 2 of the elimination game. In the first round, the players do not begin game play in round 2 until all of the slots in round 2 are filled.

Between the start and $T_1$ all of the eight players play the slot game and attempt to reach the milestone in the slot game needed to obtain a slot in the second elimination game round. At time $T_1$ all of the slots available for round 2 are filled, 5 players, P3, P5, P1, P7 and P8 have earned a slot in round 2 in that order, i.e. P3 was the first player to earn a slot, P5 was the second player to earn a slot, etc. Three players, P2, P4, and P6 were removed from the elimination game when player P8 earned the last spot in the second elimination game round. In the second elimination game round, the remaining players, P3, P5, P1, P7 and P8 play a pachinko game. The players compete to reach a pachinko game milestone. When one of the players reaches the pachinko game milestone, the player obtains a slot in the third elimination game round. As soon as the player obtains a slot in the third elimination game round, the player may begin game play in the third elimination round, which is black jack, without waiting for the remaining slots in the third elimination game round to be filled.

For instance, between times $T_1$ and $T_2$, players P3, P5, P1, P7 and P8, each play the pachinko game. At time $T_z$, player, P5, has reached the pachinko game milestone for the second elimination game round and begun blackjack game play in the third elimination game round while players P3, P1, P7 and P8 compete for the remaining two slots in the third elimination game round. Between $T_2$ and the finish of the elimination game round, player P1 reaches the milestone in the second elimination game round while players P7 and P8 compete to obtain the third slot in the third elimination game round and while player P5 attempts to obtain the milestone in the third elimination game round and finish the elimination game.

Before P5 obtains the milestone in the third elimination game round and before either P7 and P8 obtain the milestone in the second elimination game round to earn the final slot in the third elimination game round, P1 obtains the milestone for the third elimination game round and reaches the finish of the elimination game. When P1 reaches the finish of the elimination game, P5, P7 and P8 are eliminated. P1 may earn an award for finishing the elimination game. Although, when P1 is a virtual player, P1 may not actually receive the award. Further, the other players may earn awards or prizes for their progress in the elimination game. For example, P3, P5, P1, P7, and P8, may earn an award for reaching the second elimination game round. In addition, Player, P5, may earn an award for reaching the third elimination game round.

Figure 3A:
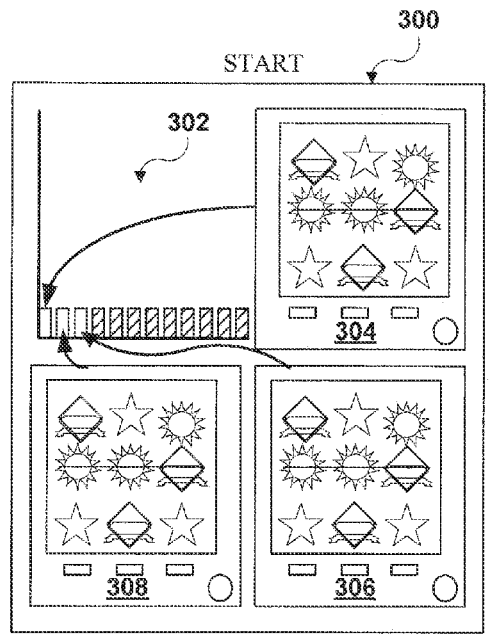
FIG. 3A-3D are block diagrams depicting an example of an elimination slot game of the present disclosure.
Figure 3B:
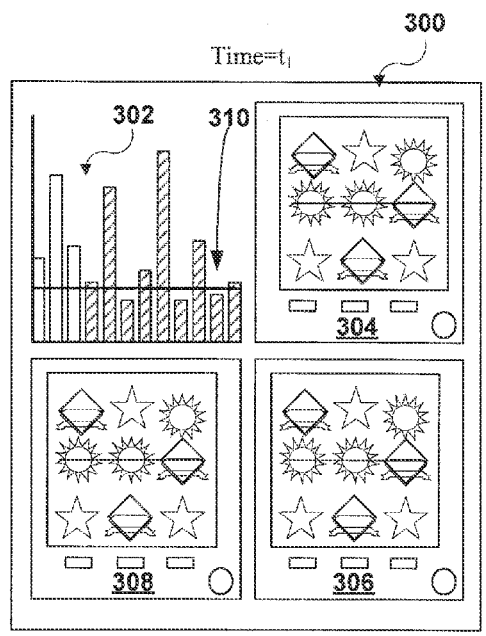
Figure 3C:
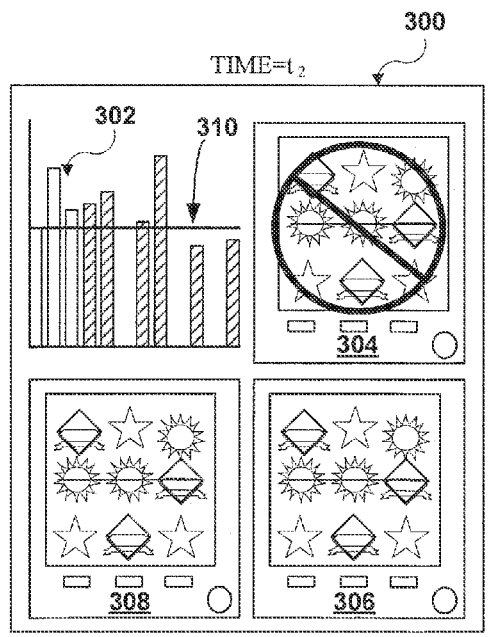
Figure 3D:
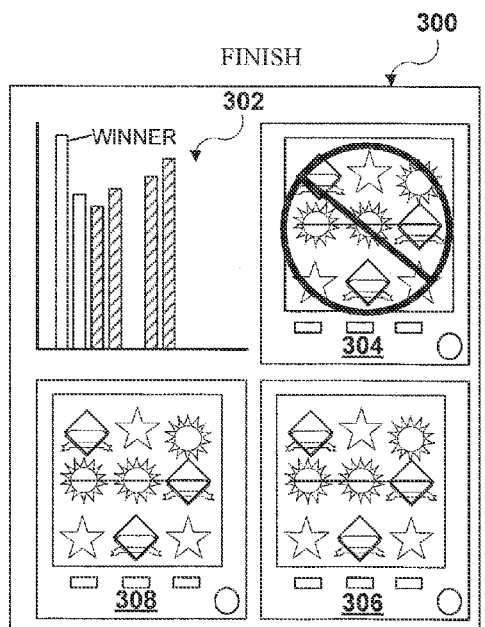

FIG. 3A-3D are block diagrams depicting a play of an elimination slot game of the present disclosure on a display screen 300 of a game machine. The display screen 300 depicts the elimination game at 4 different stages in the elimination game: 1) a start (FIG. 3A), 2) a first time in the (FIG. 3B), 3) a second time (FIG. 3C) and 4) a finish (FIG. 3D). In FIG. 3A, an elimination game is initiated with 12 entities. In this example, which is provided for illustrative purposes only, the 12 entities play a slot game. In the slot game play, a score is generated for each entity.

Twice within the elimination game, an elimination test is applied. In the first elimination test, the scores of the 12 entities in the slot game are compared to each other and one fourth of the entities with the lowest scores are removed from the elimination game. In the second elimination test, the scores of the 9 entities remaining in the slot game are compared to each other and one third of the entities with the lowest scores are removed from the elimination game. Therefore, three entities are removed the first time the elimination test is applied and three entities are removed the second time the elimination test is applied. After the second elimination test is applied, the remaining six entities play the slot game. All of the remaining six entities reach the finish of the elimination game and are ranked according to their score in the slot game play.

In one embodiment of the present disclosure, a single player playing an elimination game on the gaming machine may control multiple entities enrolled in the elimination game. For example, the slot games, 304, 306, and 308 on display screen 300 may be controlled by a single player. The slot games are played independently of one another. The outcomes of the slot games 304, 306 and 308 are used to generate scores for three different entities enrolled in the elimination game. Therefore, the single player controls 3 of the 12 entities in the elimination game. The single player may have to pay a participation fee that increases according to the number of entities it controls. In a stand-alone game, the remaining 9 entities of the 12 entities in the elimination game may be generated by the gaming machine as virtual players. In a linked game, the remaining 9 entities may be real players or combinations of real players and virtual players. Further in the linked elimination game, each real player in the linked elimination game may control one or more entities. As described above, multiple players may also participate in the elimination game as a single entity such as when team game play is used in the elimination game.

When the single player controls multiple entities in the elimination game, the single player may be able to make wagers based upon how combinations of entities under their control perform in the elimination game or may receive higher awards based upon how combinations of entities under their control perform in the elimination game. For instance, when anyone of three entities controlled by the single player reaches the finish of the elimination game, the single player may be provided one award for each entity that completes the finish of the elimination game independent of the performance of the other two entities. In this case, the awards may be no different than when three separate players control the three entities. Further, the single player may receive an additional award for different combinations of how the three entities under their control perform in the elimination game such as but not limited to: 1) two of the three entities reach the finish of the elimination game generates a first award; 2) three out of three entities reach the finish of elimination game generates a second award, and 3) two of the entities obtain the first highest score and the second highest score at the finish elimination game generates a third award. In this case, the awards are different than when three separate players control the three entities. These betting combinations are similar to a roulette game where a single player participating in the roulette game may make a wager on a single number or combinations of numbers in the roulette game.

In FIG. 3A, at the start of the elimination game, the performance of each entity in the elimination game is shown in a portion of the display screen 302 as a scoreboard. In the present example, the performance shown in the portion of the display screen is a score in the elimination game. The scores of the three entities, 304, 306 and 308 controlled by the single player are displayed as three white rectangles in 302. The performance of each of the entities in the elimination game may be regularly updated during the elimination game. For linked elimination games involving game play on multiple gaming machines, an elimination game server may combine scores generated on a number of different gaming machines into a single scoreboard that displays the performance of each player in the elimination game as is shown in 302. The scoreboard in 302 is only one example of a scoreboard that may be used with the present disclosure and many different types of scoreboards with different formats may be employed with the present disclosure.

At time, $t_1$, in FIG. 3B, the scores in the slot game played by each entity are displayed on the scoreboard in 302 just before the first elimination test is applied. For the slot game play, the single player that controls three entities may have initiated slot game play for each of three entities simultaneously. For instance, by pressing a single input button, the single player may play each of the three slot games. As another example, the player may press three separate input buttons where each input buttons initiates the slot game for a different entity. In the first elimination test, the three entities below the horizontal performance line 310 on the scoreboard are removed from the elimination game. The scores of entities 304, 306 and 308 are all above the performance line 310 and thus are not removed from the elimination game. After the first elimination test, for the next round of slot game play, the scores of all of the remaining entities may be reset to zero or the entities may start from their score in the previous round.

At time, $t_2$, in FIG. 3C, the scores in the slot game played by each of the remaining nine entities is displayed on the scoreboard in 302 just before the second elimination test is applied. In the second elimination test, the three entities below the performance line 310 on the scoreboard are removed from the elimination game. The scores of entities 306 and 308 are above the line 310, and thus, are not removed from the elimination game. The score of entity 304 is below the line 310 and therefore entity 304 is removed from the elimination game.

Between time $t_2$ and the finish of the elimination game, the remaining six entities in the elimination game compete in additional slot game play. In FIG. 3D, the scores of each of the six entities in the slot game play is shown on the scoreboard in the portion of the display screen 302. At the finish of the elimination game, entity 308 achieves the highest score and is the winner of the elimination game. Therefore, entity 308 receives an award. Among other factors, the award amount for entity 308 for winning may be based upon odds of entity 308 winning the elimination game and the initial participation fee (e.g., a wager) that was made by the single player controlling entities 304, 306 and 308. The odds in elimination game may be affected by a number of parameters such as the number of entities competing in the elimination game.

FIG. 4A-4D are block diagrams depicting an example of elimination games played in a parallel for one embodiment of the present disclosure. In the present disclosure, multiple elimination games may be played in parallel on a gaming machine by a single player. In parallel play of elimination games, a player may enroll in a first elimination game and begin elimination game play for the first elimination game. Prior to the finish of the first elimination game, the player may enroll in a second elimination and begin play in the second elimination game.

The multiple elimination games may be displayed simultaneously on the display screen of a gaming machine. The multiple elimination games played in parallel may be generated when the gaming machine is operating in a standalone mode. Further, multiple elimination games, involving groups of gaming machines linked together, may be played by the player on the gaming machine. For example, an elimination game server may be provide a number of elimination games to one or more groups of gaming machines that may be played in parallel. Details of parallel game playing methods that may be used with the present disclosure are described in co-pending U.S. application Ser. No. 09/553,437, filed on Apr. 19, 2000, by Brosnan et al., "Entitled Parallel Games on a Gaming Machine," which is incorporated herein by reference in its entirety and for all purposes.

In another embodiment, a gaming machine may support stand-alone elimination game play and elimination game play in parallel. For instance, the gaming machine may generate a first elimination game that is played by the player and the gaming machine may communicate with the elimination game server that generates a second elimination game for a group of players that is provided on the gaming machine. The player may play in parallel the first elimination game generated by the gaming machine and the second elimination game generated by the elimination game server.

In yet another embodiment, on a gaming machine, a player may play in parallel elimination games and traditional video games of chance, such as slot games and video poker games. For example, the player may enroll in an elimination game. Prior to reaching the finish of the elimination game or prior to being eliminated from the elimination game, the player may play one or more slot games separate from the elimination game where the player makes a wager, initiates the game, plays the game and is notified of the outcome of the game. Further, as was described with respect to FIGS. 1A and 1B, the parallel game play may occur within the game play of the games provided in the elimination game. For example, during the elimination game, the player may make a wager on a game of chance such as a slot game, initiate the game, play the game and be notified of the outcome (e.g., an award amount) of the game where the outcome of the game may be tied to an elimination test in the elimination game. The award amount for the slot game may be provided to the player independently of their performance in the elimination game.

Figure 4A:
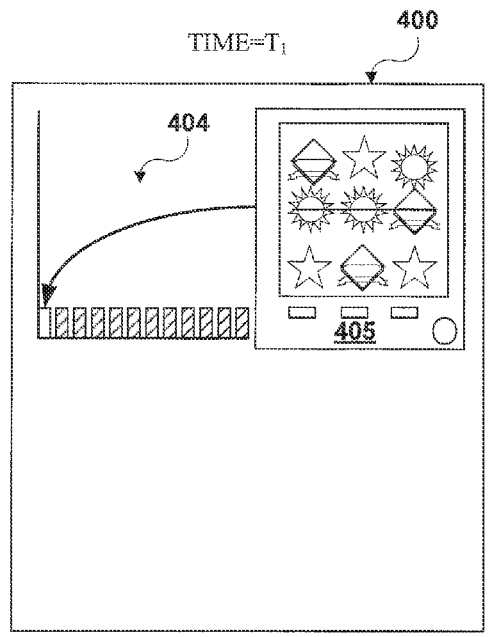
FIG. 4A-4D are block diagram depicting an example of elimination games played in a parallel.
Figure 4B:
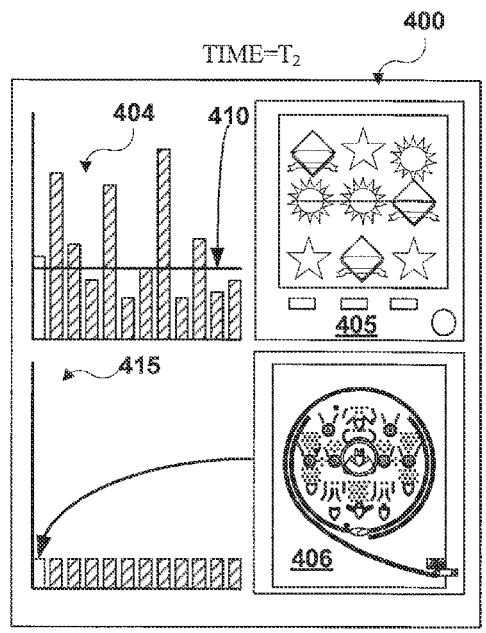
Figure 4C:
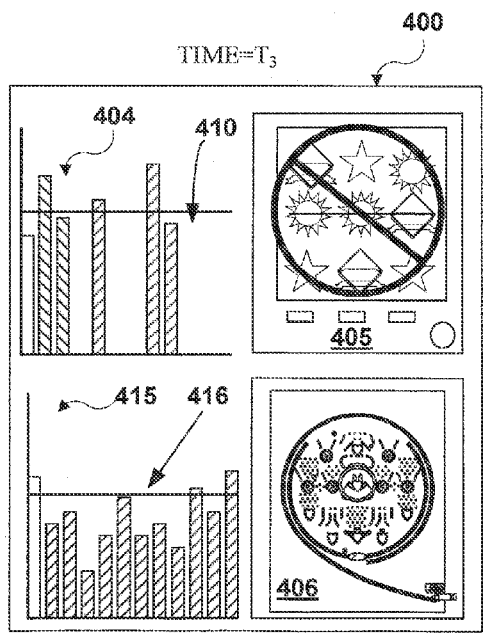
Figure 4D:
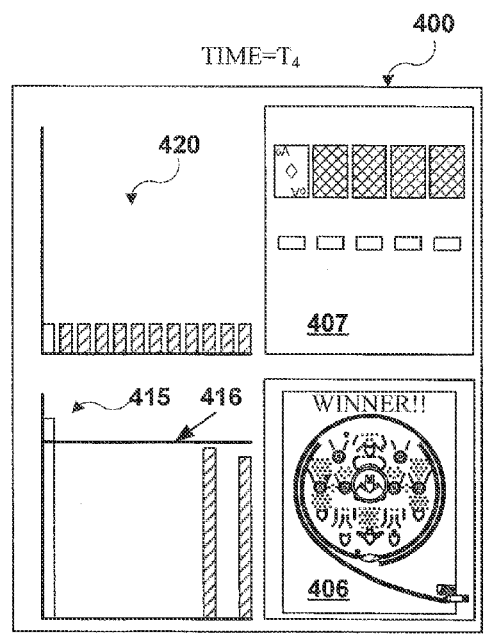
Figure 5B:
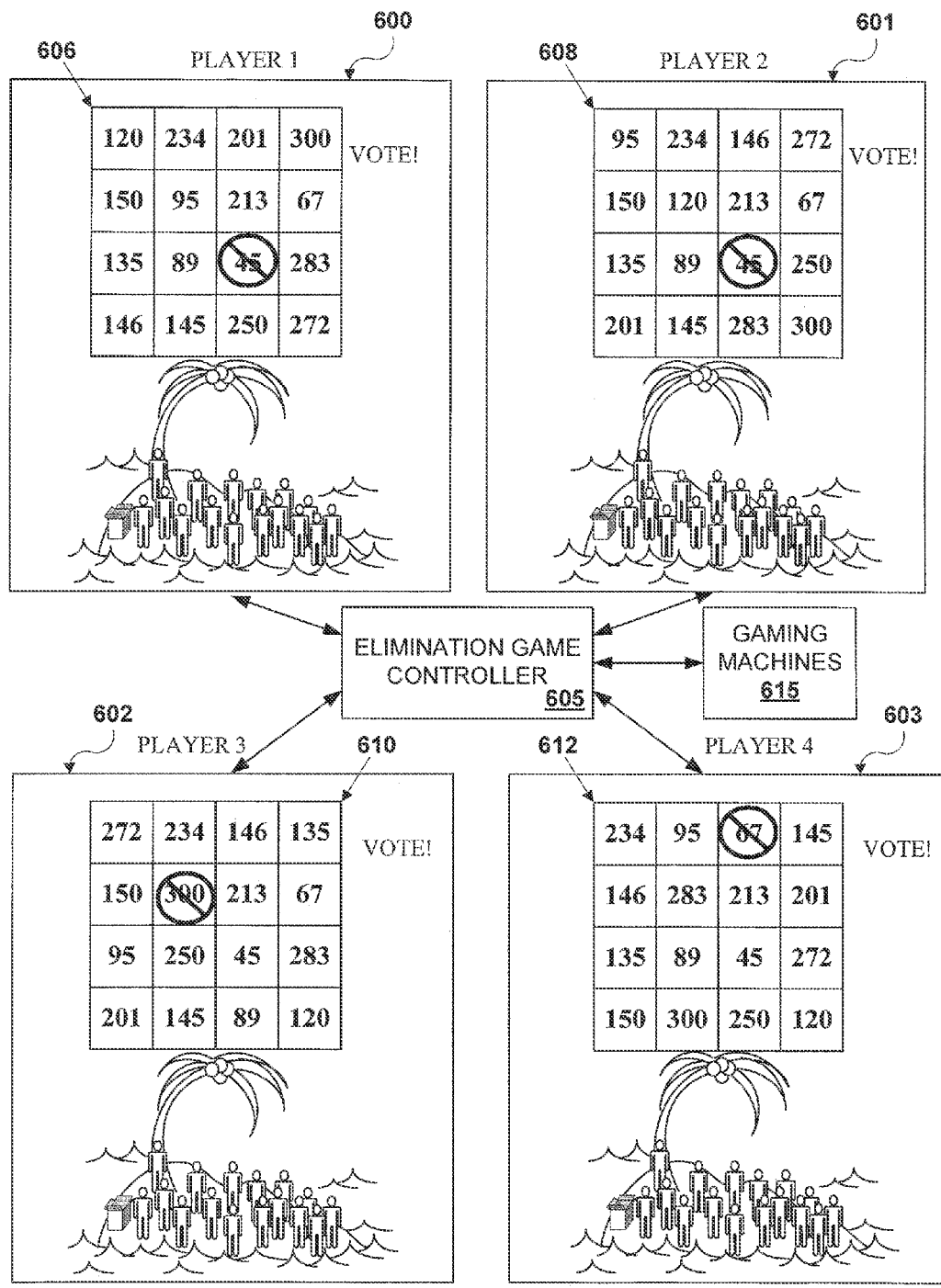

In FIGS. 4A-4D, elimination games played in parallel are displayed on the display screen 400 of a gaming machine at four different times, $t_1$ (FIG. 4A), $t_2$ (FIG. 4B), $t_3$ (FIG. 4C), and $t_4$ (FIG. 4D). At time $t_1$, the player enrolls in a first elimination game. The first elimination game involves playing a slot game 405 with 12 other entities. A scoreboard 404 for the first elimination game is displayed on the display screen 400 where the performance of a first entity in the slot game 405 is denoted by the first white rectangle on the scoreboard 404. The first entity comprises the player playing the slot game 405 on the gaming machine.

Between times $t_1$ and $t_2$, the player plays the slot game 405 in the first elimination game. At time, $t_2$, an elimination test is applied in the first elimination game and six of the entities with a performance in the slot game below a performance line 410 on the scoreboard 404 are removed from the elimination game. The first entity, which controlled by the player, is not eliminated after the first elimination test.

While the player is participating in the first elimination game, at time $t_2$, the player enrolls in a second elimination game. The second elimination game includes 12 entities. The game play in the second elimination game uses a video pachinko game 406. A scoreboard 415 for the second elimination game is shown on the display 400. A score generated from the pachinko game 406 is shown as the first white rectangle on the scoreboard 415. After enrolling in the second elimination game, the player now controls a single entity in each of the first elimination game and second elimination game at the same time. Details of video pachinko game methods that may be used with the present disclosure are described in co-pending U.S. application Ser. No. 09/553,438, filed on Apr. 19, 2000, by Brosnan et al. and titled, "Video Pachinko on a Video Platform as a Gaming Machine," which is incorporated herein in its entirety and for all purposes.

Between time $t_2$ and $t_3$, the player participates simultaneously in slot game play 405 in the first elimination game and video pachinko game play 406 in the second elimination game. At time $t_3$ (FIG. 4C), a second elimination test is applied in the first elimination game and the player is eliminated from the elimination game. In the second elimination test, the entities below the performance line 410 on the scoreboard 404 on display 400 are removed from the elimination game. At time $t_3$, a first elimination test is applied in the second elimination game. In the first elimination test of the second elimination game, the entities below the performance line 416 in the scoreboard 415 on display 400 are removed from the elimination game. In the second elimination game, 9 of the 12 entities are removed from the second elimination game after the first elimination test.

Between times $t_3$ and $t_4$, the player continues video pachinko game play 406 and enrolls in a third elimination game which includes video poker game play. At time $t_4$ (FIG. 4D), the player reaches the finish of the second elimination game. The player obtains the highest score at the finish of the second elimination game and is declared the winner of the second elimination game. At $t_4$, the player has started play of the video poker game 407 which is used for game play in the third elimination game. The player is playing the third elimination game with 11 other entities. A scoreboard 420 for the third elimination is displayed on the display screen 400.

FIGS. 5A and 5B are block diagrams of an example of voting used in an elimination game. The voting may be provided as part of game play in an elimination game and the results from the voting may be used as part of an elimination test in the elimination game. In FIG. 5A, a display screen 410 on a gaming machine at two times, $t_1$ and $t_2$, is shown. At $t_1$, a player participating in the elimination game is requested to vote for removal of one entity from the elimination game. When voting, a player may have one or more votes. The entities in the elimination game are represented as people on an island. When the voting is provided in the elimination game as part of the game play, 16 entities are enrolled. Therefore, 16 people are represented on the island.

In one embodiment of the present disclosure, a scoreboard 414 representing the scores of the sixteen entities in a game prior to the vote may be provided. The scores on the scoreboard 414 may be used to influence the vote of each entity. For example, depending on the rules of the elimination game, entities may be influenced to vote to remove low scorers in the game play or to remove high scorers in the game play. In general, a scoreboard with indicators of performance during game play by the entities is not required for voting.

In other embodiments, each entity may randomly choose another entity for removal from the elimination game. In one example, an entity may not be able to determine their own identity for the purposes of voting. In this case, the entity may be allowed to vote to remove themselves from the elimination game. In another example, the entity may not be allowed to vote to remove themselves from the elimination game even when they unknowingly select themselves.

The identities of the players for the purposes of voting may be hidden to prevent groups of players from colluding to influence an outcome of the elimination game in elimination games involving linked gaming machines. For example, the players working in collusion may try to vote other players not in their group out of the elimination game and then share any winnings among themselves. In some elimination games, team play may be part of the rules of the elimination game and collusion among players may be allowed. However, in other elimination games, such as single player games, team play may not be allowed. In elimination games played on standalone gaming machine, the issue of players colluding to influence the outcome of the elimination game is not important because collusion with other players is not possible.

To select an entity for removal, the player may use an input device on the gaming machine such as a touch screen (See FIGS. 7-9 for description of gaming machine hardware). For example, to vote for the removal of the entity with the score of 45 in the game play, the player may touch the screen at this point on the display 410. After the player has touch the screen, a symbol such as circle with a slash through it may be displayed to indicate the player's choice. The player may then be asked to confirm their choice. As another example, the player may touch a figure of a person on the island on display 410 to vote for removal of the person. The player may also use other input devices on the gaming machine such as input buttons to select the entity for removal from the elimination game.

The player may be required to vote within a certain amount of time. A countdown timer may be provided on the display 410 to indicate the time remaining for the player to vote.

When the player does not vote within the allotted time, the player may lose their vote or the gaming machine may generate a vote for them.

Between times $t_1$ and $t_2$, all of the entities vote and elimination test using results from the vote is applied to the 16 entities in the elimination game. At $t_2$, the scoreboard 416 indicates the entities removed from the elimination game based upon conditions used in the elimination test that was applied. At least one of the conditions in the elimination test used the vote totals. As described with respect to FIG. 1A, an elimination test may use a plurality of conditions. Therefore, the vote totals may be one of many conditions used in the elimination test.

After the vote and the application of the elimination test, 6 entities out of the 16 entities are removed from the elimination game. The entities are shown as removed figures from the island on the display screen 410. Also, a circle with a slash is placed on the scoreboard 416 over the scores of all of the entities removed from the elimination game. The player using the display 410 on the gaming machine has not been removed and the player is notified with a message "you survived" on the display screen 410 to indicate the player has not been removed.

In FIG. 5B, 4 entities enrolled in an elimination game using linked gaming machines are provided with an opportunity to vote for the removal of one of the entities from the elimination game. Four display screens, 600, 601, 602 and 603, are shown. The four display screens each reside on a separate gaming machines and include a visual interface that may be used in a voting process.

The four gaming machines with display screens 600, 601, 602 and 603 communicate with an elimination game controller 605 via a network connection of some type (See FIG. 8 for more network details). The elimination game controller 605 may be a component in an elimination game server that provides elimination games to a plurality of gaming machines. The plurality of gaming machines may include the additional gaming machines 615. When the elimination game server is a gaming machine, the elimination game controller may be a master gaming controller on the gaming machine (see FIG. 7).

The elimination game server with the elimination game controller 605 receives the voting selections from the gaming machines participating in the elimination game. The elimination game controller 605 tallies the votes and applies an elimination test using at least the vote tallies. The results of the elimination test may then be sent to the gaming machines participating in the elimination game. For example, when the outcome of the elimination test is determined, the elimination game controller 605 may update the scoreboards 606, 608, 610 and 612 on the four gaming machines with the display screens 600, 601, 602 and 603. The elimination game controller 605 may remove the eliminated entities from the elimination game. Further, the elimination game controller 605 may direct the gaming machines with entities that have been eliminated 1) to remove the entities from the elimination game and 2) to notify the players on the gaming machines of the entities status in the game.

The elimination game includes 16 entities and each entity is represented as a figure on the display screens. The entities may be asked to select one of the 16 entities represented on the scoreboards 606, 608, 610 and 612 for elimination. The same 16 entities are represented on each of the scoreboards 606, 608, 610 and 612. However, a position of each entity on the scoreboards varies from scoreboard to scoreboard. The positions on the scoreboard may be randomized to prevent other players, such as on adjacent gaming machines, from determining which entities they are selecting for elimination and therefore work in collusion.

The vote selections on the four displays are as follows. On display 600, the entity with a 45 on the scoreboard 606 is selected. On display 601, the entity with the score of 45 on scoreboard 606 is also selected for elimination. On display 602, the entity with a score of 300 is selected for elimination and on display 603, the entity with a score of 67 is selected for elimination. Therefore, in some embodiments, an entity may receive multiple votes. In other embodiments, an entity may receive only a single vote. In one embodiment, the selection may be a vote for elimination from the elimination game. In another embodiment, the selection may be a vote for non-elimination from the elimination game. Further, the entities may receive a plurality of votes where some of the votes may be used to determine elimination and other votes may be used to determine non-elimination from the elimination game.

FIG. 6 is block diagram of an example of an elimination game incorporating team play. Two gaming machines 700 and 701 with display screen 702 and 703 are connected to the elimination game controller 605. Additional, gaming machines (not shown) may also be connected to the elimination game controller 605.

In the elimination game on the display screen 702 and 703, the entities in the elimination game are divided into two teams. The game played by the two teams is dodge ball. The two teams comprise a number of players. The players on each team may be combinations of real players and virtual players. The players playing on gaming machines 700 and 701 may be on the same team or on different teams. In one embodiment, dodge ball games involving more than two teams may be implemented with the present disclosure. For instance, the entities may be divided into four teams where each of the four teams occupies a corner of the playing field.

During the elimination game, a player selects another player on the team opposite them for elimination. The selected player has a finite probability of being eliminated during an elimination test. When the conditions of the elimination test are met, a ball or some other object is thrown by a player on one of the teams and the ball is shown hitting the selected player on the other team. The hit player is removed from the playing surface such as player 704 on display screen 702. When the conditions of the elimination test are not met, a ball is thrown by a player on one of the teams, the ball is misses the selected player and the selected player may be shown dodging the ball. Further, a player one team may be selected for elimination by multiple players and multiple balls may be shown hitting the player selected multiple times. In another embodiment of the present disclosure, the players may throw food at one another such as pies instead of balls.

The selection process and subsequent elimination process may occur in an asynchronous manner where the players on each team may be throwing the balls at different times. In one embodiment, the players may be able to throw one ball per allotted time period but may throw a ball at any time during the time period. The display screen may flash each time the player is allowed to launch a ball.

To finish the dodge ball game, the team that eliminates all of the players on other team first is the declared the winner. In one embodiment of the present disclosure, only the players that remain on the winning team at the end of the game are provided with an award amount. In another embodiment of the present disclosure, all of the players on the winning team that were in the elimination game at the start of the elimination game are provided an award amount even if they were removed from the elimination game prior to end of the elimination game. Although, the award amount for the players removed prior to the end of the elimination game may be less than the award amount for the players that reach the finish of the elimination game. In another embodiment, the award amount given to each player on the winning team may be proportional to an amount of players they hit on the losing team during the elimination game.

FIG. 7 is a block diagram of networked gaming machines and gaming devices that provide stand-alone elimination game play, linked elimination game play and progressive elimination games for one embodiment of the present disclosure. A master gaming controller 224 is used to present one or more games of chance on the gaming machines 61, 62 and 63. The master gaming controller 224 may also act as an elimination game controller. As an elimination game controller, the master gaming controller 224 may be used to generate elimination games on one (e.g., stand-alone elimination game) or more gaming machines (e.g., linked elimination game). In one embodiment, the elimination game may be generated as a bonus elimination game to the one or more games of chance played on the gaming machines, such as 61, 62 and 63.

For a bonus elimination game involving a plurality of linked gaming machines, an elimination game server 90 with an elimination game controller 92 may be used to generate the outcome of the bonus elimination game which is displayed on the plurality of gaming machines such as 61, 62 and 63. The outcomes of the bonus elimination games and other linked elimination games may be based upon game play generated on the plurality of gaming machines in communication with the elimination game server 90. The elimination game server 90 may use game play results from the plurality of gaming machines to apply elimination tests used in the elimination games. Further, the elimination game server may use game play results from each gaming machine to regularly update an elimination game scoreboard (see FIGS. 3A-3D) during the course of the play of the elimination game. As described with respect to FIGS. 4A-4D, the elimination game server 90 or a gaming machine, such 61, 62 and 63, may provided a plurality of elimination games in parallel i.e. at the same time.

The outcomes of the elimination tests may be sent to the gaming machines in communication with the elimination game server 90. The gaming machines may receive the outcomes of the elimination tests and generate a presentation outcome for the elimination test results. For instance, when one of the gaming machines receives a message from the elimination game server that the player participating in the elimination game from the gaming machine has been eliminated from the elimination game, the gaming machine may generate a presentation outcome that corresponds to the player being removed from the elimination game. In one embodiment, the elimination game server 90 may generate the presentation outcome for the elimination game and send it directly to the gaming machine. In other embodiments, the gaming machines generate the presentation outcomes for various events in the elimination game based upon information received from the elimination game server.

The master gaming controller 224 executes a number of gaming software modules to operate gaming devices 70, such as coin hoppers, bill validators, coin acceptors, speakers, printers, lights, displays (e.g. 34) and other input! output mechanisms (see FIGS. 8 and 9). The master gaming controller 224 may also execute gaming software enabling communications with gaming devices located outside of the gaming machines 61, 62 and 63, such as elimination game servers (e.g., 90), elimination game progressive servers (e.g., 82), player tracking servers, bonus game, servers, game servers, progressive game servers. In some embodiments, communications with devices located outside of the gaming machines may be performed using the main communication board 215 and network connections 71. The network connections 71 may allow communications with remote gaming devices via a local area network, an intranet, the Internet or combinations thereof. The elimination game server 90 may also communicate with a number of game devices via the network connections 71 such as but not limited to the gaming machines 61, 62 and 63, the elimination game progressive server 82 and the remote gaming machines 64 and 65.

The gaming machines 61, 62 and 63 may use gaming software modules to generate a game of chance and an elimination game of chance that may be distributed between local file storage devices and remote file storage devices. For example, to play a elimination game on gaming machine 61, the master gaming controller may load gaming software modules into RAM 56 that may be may be located in 1) a file storage device 226 on gaming machine 61, 2) an elimination game server 90, 3) a file storage device 226 on gaming machine 62, 4) a file storage device 226 on gaming machine 63, or 5) combinations thereof. In one embodiment of the present disclosure, the gaming operating system may allow files stored on the local file storage devices and remote file storage devices to be used as part of a shared file system where the files on the remote file storage devices are remotely mounted to the local file system. The file storage devices may be a hard-drive, CD-ROM, CD-DVD, static RAM, flash memory, EPROM's, compact flash, smart media, disk-on chip, removable media (e.g. ZIP drives with ZIP disks, floppies or combinations thereof. For both security and regulatory purposes, gaming software executed on the gaming machines 61, 62 and 63 by the master gaming controllers 224 may be regularly verified by comparing software stored in RAM 56 for execution on the gaming machines with certified copies of the software stored on the gaming machine (e.g. files may be stored on file storage device 226), accessible to the gaming machine via a remote communication connection.

The elimination game server 90 may also be a repository for game software modules and software for other game services provided on the gaming machines 61, 62 and 63. In one embodiment of the present disclosure, the gaming machines 61, 62 and 63 may download game software modules from the elimination game server 90 to a local file storage device to play a game of chance or an elimination game. The download of game software may be initiated by the elimination game server 90. One example of a game server that may be used with the present disclosure is described in co-pending U.S. application Ser. No. 09/042,192, filed on Jun. 16, 2000, entitled "Using a Gaming Machine as a Server" which is incorporated herein in its entirety and for all purposes. In another example, the game server might also be a dedicated computer or a service running on a server with other application programs.

In one embodiment of the present disclosure, the processors used to generate a game of chance or an elimination game may be distributed among different machines. For instance, the game flow logic to play an elimination game may be executed on the elimination game server 90 by the elimination game controller 92 while the game presentation logic for the elimination game may be executed on gaming machines 61, 62 and 63 by the master gaming controllers 224. The gaming operating systems on gaming machines 61, 62 and 63 and the elimination game server 90 may allow gaming events to be communicated between different gaming software modules executing on different gaming machines via defined APIs. Thus, a game flow software module executed on the elimination game server 90 may send gaming events to a game presentation software module executed on gaming machine 61, 62 or 63 to control the play of a game of chance, to control the play of a bonus game of chance, to control the play of an elimination game or to control the play of an elimination bonus game presented on gaming machines 61, 62 and 63. As another example, the gaming machines 61, 62 and 63 may send gaming events to one another via network connection 71 to control the play of the shared elimination bonus game played simultaneously on the different gaming machines.

As described with respect to FIGS. 1A and 1B, progressive jackpots may be awarded as part of an elimination game. The progressive jackpots may be funded by groups of gaming machines of various sizes. For example, a group of gaming machines connected together in a casino may fund a progressive jackpot in an elimination game. As another example, gaming machines distributed over many gaming properties may be used to fund a progressive jackpot in an elimination game.

In FIG. 7, an elimination game progressive server 82 is connected to gaming machine 61, 62 and 63 and the remote gaming machine 64 and 64 via a wide area progressive network 81. The elimination game progressive server 82 may also contain an elimination game controller and provide elimination games to the gaming machines in communication with the elimination game progressive server. A portion of the participation fees for elimination games played at the gaming machines in communication with the elimination game progressive server 82 may be used to fund a progressive jackpot. The amount of the elimination game progressive jackpot may be continually updated by the elimination game progressive server. Further, the amount of the elimination game progressive jackpot may be displayed on the gaming machines in communication with elimination game progressive server or may be displayed on a display device near the gaming machines.

FIG. 8 is a block diagram of a gaming machine 2 of the present disclosure. Common reference numerals used in FIGS. 7 and 9 are used. A master gaming controller 224 controls the operation of the various gaming devices and the game presentation (e.g., games of chance, bonus game of chance, elimination games and bonus elimination games) on the gaming machine 2. The master gaming controller 224 may communicate with other remote gaming devices such as remote servers via a main communication board 215 and network connection 214. The master gaming controller 224 may also communicate other gaming devices via a wireless communication link 242. The wireless communication link may use a wireless communication standard such as but not limited to IEEE 802.11a, IEEE 802.11b, IEEE 802.11x (e.g. another IEEE 802.11 standard such as 802.11c or 802.11e), hyperlan/2, Bluetooth™ and HomeRF.

Using a game code and graphic libraries stored on the gaming machine 2, the master gaming controller 224 generates a game presentation which is presented on the displays 34 and 42. The game presentation may be for a traditional game of chance or for an elimination game. The game presentation is typically a sequence of frames updated at a rate of 75 Hz (75 frames/sec). For instance, for a video slot game, the game presentation may include a sequence of frames of slot reels with a number of symbols in different positions. When the sequence of frames is presented, the slot reels appear to be spinning to a player playing a game on the gaming machine. The final game presentation frames in the sequence of the game presentation frames are the final position of the reels. Based upon the final position of the reels on the video display 34, a player is able to visually determine the outcome of the game. This video slot game presentation may be used as part of the game play in an elimination game played on the gaming machine 2.

Each frame in sequence of frames in a game presentation is temporarily stored in a video memory 236 located on the master gaming controller 224 or alternatively on the video controller 237. The gaming machine 2 may also include a video card (not shown) with a separate memory and processor for performing graphic functions on the gaming machine. Typically, the video memory 236 includes 1 or more frame buffers that store frame data that is sent by the video controller 237 to the display 34 or the display 42. The frame buffer is in video memory directly addressable by the video controller. The video memory and video controller may be incorporated into a video card which is connected to the processor board containing the master gaming controller 224. The frame buffer may consist of RAM, VRAM, SRAM, SDRAM, MRAM, etc.

The frame data stored in the frame buffer provides pixel data (image data) specifying the pixels displayed on the display screen. In one embodiment, the video memory includes 3 frame buffers. The master gaming controller 224, according to the game code, may generate each frame in one of the frame buffers by updating the graphical components of the previous frame stored in the buffer. Thus, when only a minor change is made to the frame compared to a previous frame, only the portion of the frame that has changed from the previous frame stored in the frame buffer is updated. For example, in one position of the screen, a 2 of hearts may be substituted for a king of spades. This minimizes the amount of data that must be transferred for any given frame. The graphical component updates to one frame in the sequence of frames (e.g. a fresh card drawn in a video poker game) in the game presentation may be performed using various graphic libraries stored on the gaming machine. This approach is typically employed for the rendering of 2-D graphics. For 3-D graphics, the entire screen is typically regenerated for each frame.

Pre-recorded frames stored on the gaming machine may be displayed using video "streaming". In video streaming, a sequence of pre-recorded frames stored on the gaming machine is streamed through frame buffer on the video controller 237 to one or more of the displays. For instance, a frame corresponding to a movie stored on the game partition 223 of the hard drive 226, on a CD-ROM or some other storage device may be streamed to the displays 34 and 42 as part of game presentation. Thus, the game presentation may include frames graphically rendered in real-time using the graphics libraries stored on the gaming machine as well as pre-rendered frames stored on the gaming machine 2.

For gaming machines, an important function is the ability to store and re-display historical game play information. The game history provided by the game history information assists in settling disputes concerning the results of game play. A dispute may occur, for instance, when a player believes an award for a game outcome has not properly credited to him by the gaming machine. The dispute may arise for a number of reasons including a malfunction of the gaming machine, a power outage causing the gaming machine to reinitialize itself and a misinterpretation of the game outcome by the player. In the case of a dispute, an attendant typically arrives at the gaming machine and places the gaming machine in a game history mode. In the game history mode, important game history information about the game in dispute can be retrieved from a non-volatile storage 234 on the gaming machine and displayed in some manner to a display on the gaming machine. In some embodiments, game history information may also be stored to a history database partition 221 on the hard drive 226. The hard drive 226 is only one example of a mass storage device that may be used with the present disclosure. The game history information is used to reconcile the dispute.

During the game presentation, the master gaming controller 224 may select and may capture certain frames to provide a game history. These decisions are made in accordance with particular game code executed by controller 224. The captured frames may be incorporated into game history frames. Typically, one or more frames critical to the game presentation are captured. For instance, in a video slot game presentation, a game presentation frame displaying the final position of the reels is captured. In a video blackjack game, a frame corresponding to the initial cards of the player and dealer, frames corresponding to intermediate hands of the player and dealer and a frame corresponding to the final hands of the player and the dealer may be selected and captured as specified by the master gaming controller 224.

Various gaming software modules used to play different types of games of chance may be stored on the hard drive 226. Each game may be stored in its own directory to facilitate installing new games (and removing older ones) in the field. To install a new game, a utility may be used to create the directory and copy the necessary files to the hard drive 226. To remove a game, a utility may be used remove the directory that contains the game and its files. In each game directory there may be many subdirectories to organize the information. Some of the gaming information in the game directories are: 1) a game process and its associated gaming software modules, 2) graphics/Sound files/Phrase(s), 3) a pay table file and 4) a configuration file. A similar directory structure may also be created in the NV-memory 234. Further, each game may have its own directory in the non-volatile memory file structure to allow the non-volatile memory for each game to be installed and removed as needed.

FIG. 9 is a perspective drawing of a gaming machine 2 with a top box 6 and other devices. Machine 2 includes a main cabinet 4, which generally surrounds the machine interior (not shown) and is viewable by users. The main cabinet 4 includes a main door 8 on the front of the machine, which opens to provide access to the interior of the machine. Attached to the main door are player-input switches or buttons 32, a coin acceptor 28, and a bill validator 30, a coin tray 38, and a belly glass 40. Viewable through the main door is a video display monitor 34 and an information panel 36. The display monitor 34 will typically be a cathode ray tube, high resolution flat-panel LCD, or other conventional electronically controlled video monitor. The information panel 36 may be a back-lit, silk screened glass panel with lettering to indicate general game information including, for example, the number of coins played. Many possible games of chance, including slot games, poker games, pachinko games, multiple hand poker games, pai-gow poker games, blackjack games, keno games, bingo games, roulette games, craps games and card games may be played on the gaming machine. These games may also be used as part of game play in the elimination games of the present disclosure. In addition bonus games of chance and elimination bonus games may be provided with the present disclosure.

The bill validator 30, coin acceptor 28, player-input switches 32, video display monitor 34, and information panel are devices used to play a game on the game machine 2. The devices are controlled by a master gaming controller (see FIG. 8) housed inside the main cabinet 4 of the machine 2. In the operation of these devices, critical information may be generated that is stored within a non-volatile memory storage device 234 (See FIG. 8) located within the gaming machine 2. For instance, when cash or credit of indicia is deposited into the gaming machine using the bill validator 30 or the coin acceptor 28, an amount of cash or credit deposited into the gaming machine 2 may be stored within the non-volatile memory storage device 234. As another example, when important game information, such as the final position of the slot reels in a video slot game, is displayed on the video display monitor 34, game history information needed to recreate the visual display of the slot reels may be stored in the non-volatile memory storage device. The type of information stored in the non-volatile memory may be dictated by the requirements of operators of the gaming machine and regulations dictating operational requirements for gaming machines in different gaming jurisdictions The gaming machine 2 includes a top box 6, which sits on top of the main cabinet 4. The top box 6 houses a number of devices, which may be used to add features to a game being played on the gaming machine 2, including speakers 10, 12, 14, a ticket printer 18 which prints bar-coded tickets 20, a key pad 22 for entering player tracking information, a florescent display 16 for displaying player tracking information and a card reader 24 for entering a magnetic striped card containing player tracking information.

The top box 6 may house different or additional devices than shown in the FIG. 9. For example, the top box may contain a bonus wheel 44 or a back-lit silk screened panel which may be used to add bonus features to the game being played on the gaming machine. During a game, these devices are controlled and powered, in part, by the master gaming controller housed within the main cabinet 4 of the machine 2.

The bonus wheel 44 may be used as part of an elimination game. The bonus wheel include various tiles that allow a player to advance or to be eliminated in elimination games. A spin of the wheel may be used as part of the elimination game played on the gaming machine 2. For example, an elimination test may be implemented on the bonus wheel 44 where a percentage of the tiles allow the player to advance to the next elimination game and a percentage of the tiles eliminate the player from the elimination game. Thus, the outcome of the elimination test may be determined by the player from a final position of the wheel after it has been spun.

Understand that gaming machine 2 is but one example from a wide range of gaming machine designs on which the present disclosure may be implemented. For example, not all suitable gaming machines have top boxes or player tracking features. Further, some gaming machines have only a single game display-mechanical or video, while others are designed for bar tables and have displays that face upwards. As another example, a game may be generated in on a host computer and may be displayed on a remote terminal or a remote gaming device. The remote gaming device may be connected to the host computer via a network of some type such as a local area network, a wide area network, an intranet or the Internet. The remote gaming device may be a portable gaming device such as but not limited to a cell phone, a personal digital assistant, and a wireless game player. Images rendered from 3-D gaming environments may be displayed on portable gaming devices that are used to play a game of chance. Further a gaming machine or server may include gaming logic for commanding a remote gaming device to render an image from a virtual camera in a 3-D gaming environments stored on the remote gaming device and to display the rendered image on a display located on the remote gaming device. Thus, those of skill in the art will understand that the present disclosure, as described below, can be deployed on most any gaming machine now available or hereafter developed.

Returning to the example of FIG. 13, when a user wishes to play the gaming machine 2, he or she inserts cash through the coin acceptor 28 or bill validator 30. Additionally, the bill validator may accept a printed ticket voucher which may be accepted by the bill validator 30 as an indicia of credit. The indicia of credit may be used to provide a participation fee in the elimination games of the present disclosure. During the game, the player typically views game information and game play using the video display 34 and the secondary display 42. In one embodiment, the secondary display may be used to display a scoreboard (see FIGS. 3A-3D) that is used in the elimination game. Further, the secondary display may be used to display the outcome of an elimination test applied in the elimination game.

During the course of a game, a player may be required to make a number of decisions, which affect the outcome of the game. For example, a player may vary his or her wager on a particular game, select a prize for a particular game, or make game decisions which affect the outcome of a particular game. The player may make these choices using the player-input switches 32, the video display screen 34 with a touch screen or using some other device which enables a player to input information into the gaming machine. For example, the player may use the touch screen to select other entities enrolled in the elimination game for removal during elimination game play on the gaming machine. Certain player choices may be captured by player tracking software loaded in a memory inside of the gaming machine. For example, the rate at which a player plays a game or the amount a player bets on each game may be captured by the player tracking software. The player tracking software may utilize the non-volatile memory storage device to store this information.

During certain game events, the gaming machine 2 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 2 or from lights behind the belly glass 40. After the player has completed a game, the player may receive coins or game tokens from the coin tray 38 or the ticket 20 from the printer 18, which may be used for further games or to redeem a prize. Further, the player may receive a ticket 20 for food, merchandise, or games from the printer 18.

Although the foregoing disclosure has been described in some detail for purposes of clarity of understanding, it will be apparent that certain changes and modifications may be practiced within the scope of the appended claims. For instance, while the gaming machines of the present disclosure have been depicted as having a display screen physically viewed through a vertical glass panel attached to a main gaming machine cabinet, the use of gaming devices in accordance with the present disclosure is not so limited. For example, the display screen features may be provided on a table top gaming machine where the display screen is viewed through a horizontal glass panel.

The invention is claimed as follows:

1. A method of operating a gaming system, the method comprising:
   (a) causing at least one processor to execute a plurality of instructions to start play of a first elimination game;
   (b) after starting play of the first elimination game, causing the at least one processor to execute the plurality of instructions to start play of a second elimination game;
   (c) causing the at least one processor to execute the plurality of instructions to cause a first gaming machine to simultaneously display at least part of the first elimination game and at least part of the second elimination game on a display of the first gaming machine; and
   (d) for the first elimination game, causing the at least one processor to execute the plurality of instructions to, based on results of a play of a game by a plurality of entities participating in the first elimination game, eliminate at least one of the plurality of entities from the first elimination game prior to completion of the first elimination game.

2. The method of claim 1, wherein the display includes a display screen of the first gaming machine.

3. The method of claim 1, further comprising: causing the at least one processor to execute the plurality of instructions to cause a second gaming machine to display the at least part of the first elimination game on a display screen of the second gaming machine.

4. The method of claim 1, further comprising: causing the at least one processor to execute the plurality of instructions to cause a third gaming machine to display the at least part of the second elimination game on a display screen of the third gaming machine.

5. A gaming machine comprising:
   an elimination game master gaming controller;
   a display screen; and
   a memory device that stores a plurality of instructions that, when executed by the elimination game master gaming controller, cause the elimination game master gaming controller to operate with the display screen and a plurality of other gaming machines to:
   (a) start play of a game of chance on the gaming machine;
   (b) start play of an elimination game on the gaming machine and the plurality of other gaming machines;
   (c) simultaneously display at least part of the game of chance and at least part of the elimination game on the display screen; and
   (d) for the elimination game, based on results of a play of a game by a plurality of entities participating in the elimination game, eliminate at least one of the plurality of entities from the elimination game prior to completion of the elimination game.

6. The gaming machine of claim 5, wherein the game of chance is selected from the group consisting of slot games, poker games, pachinko games, multiple hand poker games, pai-gow poker games, black jack games, keno games, bingo games, roulette games, craps games and card games.

7. The gaming machine of claim 5, wherein the game of chance is the game.

8. The gaming machine of claim 5, wherein one of the plurality of entities participating in the elimination game is a virtual entity generated by the elimination game master gaming controller.

9. The gaming machine of claim 5, further comprising: a communication interface used by the elimination game master gaming controller to communicate with remote gaming devices.

10. The gaming machine of claim 9, wherein the remote gaming devices are at least one of: the plurality of other gaming machines, an elimination game controller and combinations thereof.

11. The gaming machine of claim 9, wherein the elimination game master gaming controller is configured to receive elimination game information via the communication interface from the plurality of other gaming machines.

12. The gaming machine of claim 11, wherein the plurality of instructions, when executed by the elimination game master gaming controller, cause the elimination game master gaming controller to operate with the display screen to display the elimination game information received from the plurality of other gaming machines on the display screen.

13. The gaming machine of claim 5, wherein the elimination game is a bonus game triggered during play of the game of chance.

14. The gaming machine of claim 5, further comprising: a bonus wheel wherein the bonus wheel is used to display results from an elimination test for the elimination game.

* * * * *